United States Patent
Onodera

(10) Patent No.: US 7,855,729 B2
(45) Date of Patent: Dec. 21, 2010

(54) VIDEO RECORDING CONTROL SYSTEM

(75) Inventor: Katsuya Onodera, Yokohama (JP)

(73) Assignee: Victor Company of Japan, Ltd., Yokohama (JP)

(*) Notice: Subject to any disclaimer, the term of this patent is extended or adjusted under 35 U.S.C. 154(b) by 1348 days.

(21) Appl. No.: 11/352,250

(22) Filed: Feb. 13, 2006

(65) Prior Publication Data

US 2006/0204229 A1 Sep. 14, 2006

(30) Foreign Application Priority Data

Mar. 11, 2005 (JP) .............................. 2005-069179

(51) Int. Cl.
*H04N 7/18* (2006.01)
(52) U.S. Cl. ................................. 348/159; 348/231.99
(58) Field of Classification Search ....................... None
See application file for complete search history.

(56) References Cited

U.S. PATENT DOCUMENTS

| 2002/0141732 A1* | 10/2002 | Reese et al. .................... 386/46 |
| 2003/0081131 A1* | 5/2003 | Farnan et al. .......... 348/211.11 |
| 2003/0117500 A1* | 6/2003 | Lin ......................... 348/211.3 |
| 2003/0202099 A1* | 10/2003 | Nakamura et al. .......... 348/153 |
| 2004/0105450 A1* | 6/2004 | Ikuta et al. ................... 370/401 |
| 2006/0206748 A1* | 9/2006 | Li ................................ 714/4 |

FOREIGN PATENT DOCUMENTS

| JP | 11-079621 | 3/1999 |
| JP | 2003-319375 | 11/2003 |
| JP | 2004-349993 | 12/2004 |

* cited by examiner

*Primary Examiner*—Lin Ye
*Assistant Examiner*—Dennis Hogue
(74) *Attorney, Agent, or Firm*—Louis Woo

(57) ABSTRACT

A video recording control system includes monitor cameras and video recording apparatuses. The monitor cameras are assigned to the video recording apparatuses in a manner such that each of the video recording apparatuses corresponds to at least one assigned monitor camera. Each of the monitor cameras sends its video signal to the assigned one of the video recording apparatus. The video recording apparatuses record the video signals sent from the monitor cameras. A first device operates for detecting a failure of each of the video recording apparatuses. When the first device detects a failure of at least one of the video recording apparatuses, a second device changes the assignment of the monitor cameras to the video recording apparatuses so that at least one of the monitor cameras which has been assigned to the failed video recording apparatus will be newly assigned to normal one of the video recording apparatuses.

10 Claims, 11 Drawing Sheets

FIG. 4

|  | (1) IMAGE QUALITY | (2) TRANSMIT FRAME RATE FRAMES/SEC | (3) RECORD FRAME RATE FRAMES/SEC | (4) RECORD APPARATUS | (5) RECORD | (6) DISPLAY |
|---|---|---|---|---|---|---|
| CAMERA 10 | HIGH | 30 | 30 | 41 | ○ | ○ |
| CAMERA 11 | MEDIUM | 30 | 30 | 41 | ○ | × |
| CAMERA 12 | HIGH | 30 | 30 | 41 | ○ | ○ |
| CAMERA 13 | HIGH | 30 | 30 | 41 | ○ | ○ |
| CAMERA 14 | MEDIUM | 30 | 30 | 41 | ○ | × |
| CAMERA 15 | HIGH | 30 | 30 | 41 | ○ | ○ |
| CAMERA 16 | HIGH | 30 | 30 | 41 | ○ | ○ |
| CAMERA 17 | MEDIUM | 30 | 30 | 41 | ○ | × |
| CAMERA 20 | MEDIUM | 20 | 20 | 42 | ○ | ○ |
| CAMERA 21 | MEDIUM | 20 | 20 | 42 | ○ | ○ |
| CAMERA 22 | MEDIUM | 20 | 20 | 42 | ○ | × |
| CAMERA 23 | MEDIUM | 20 | 20 | 42 | ○ | × |
| CAMERA 24 | MEDIUM | 20 | 20 | 42 | ○ | × |
| CAMERA 30 | LOW | 10 | 0 | 43 | × | ○ |
| CAMERA 31 | LOW | 3 | 3 | 43 | ○ | × |
| CAMERA 32 | LOW | 3 | 3 | 43 | ○ | × |

FIG. 5

|  | (1) RECORDING CAPABILITY FRAMES/SEC | (2) USABLE RECORDING CAPACITY | (3) OPERATING CONDITION |
|---|---|---|---|
| RECORD APPARATUS 41 | 240 | 300 | 100 |
| RECORD APPARATUS 42 | 240 | 10 | 100 |
| RECORD APPARATUS 43 | 240 | 3 | 90 |

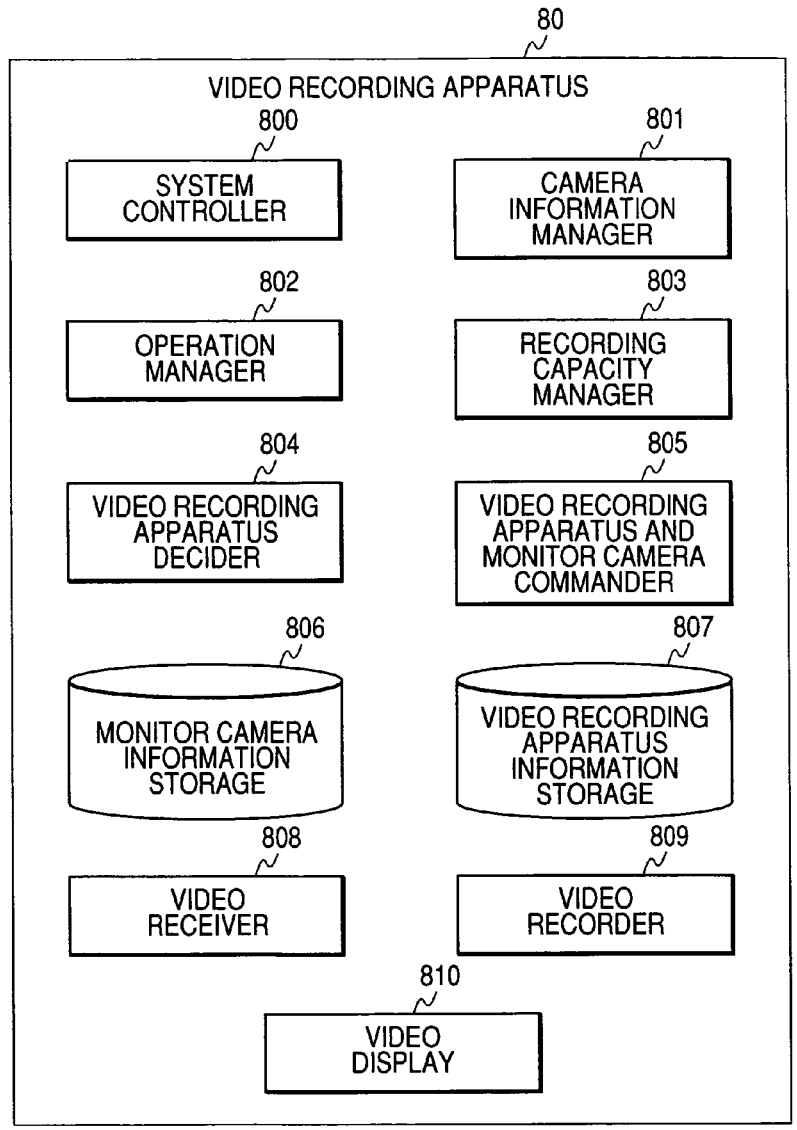

FIG. 12

|  | (1) RECORDING CAPABILITY FRAMES/SEC | (2) USABLE RECORDING CAPACITY | (3) OPERATING CONDITION |
|---|---|---|---|
| RECORD APPARATUS 41 | 240 | 10 | 100 |
| RECORD APPARATUS 42 | 240 | 100 | 90 |
| RECORD APPARATUS 43 | 240 | 300 | 90 |

FIG. 13

|  | (1) IMAGE QUALITY | (2) TRANSMIT FRAME RATE FRAMES/SEC | (3) RECORD FRAME RATE FRAMES/SEC | (4) RECORD APPARATUS | (5) RECORD | (6) DISPLAY |
|---|---|---|---|---|---|---|
| CAMERA 10 | HIGH | 16 | 16 | 41 | ○ | ○ |
| CAMERA 11 | MEDIUM | 16 | 16 | 41 | ○ | × |
| CAMERA 12 | HIGH | 16 | 16 | 41 | ○ | ○ |
| CAMERA 13 | HIGH | 16 | 16 | 41 | ○ | ○ |
| CAMERA 14 | MEDIUM | 16 | 16 | 41 | ○ | × |
| CAMERA 15 | HIGH | 16 | 16 | 41 | ○ | ○ |
| CAMERA 16 | HIGH | 16 | 16 | 41 | ○ | ○ |
| CAMERA 17 | MEDIUM | 16 | 16 | 41 | ○ | × |
| CAMERA 20 | MEDIUM | 16 | 16 | 41 | ○ | ○ |
| CAMERA 21 | MEDIUM | 16 | 16 | 41 | ○ | ○ |
| CAMERA 22 | MEDIUM | 16 | 16 | 41 | ○ | × |
| CAMERA 23 | MEDIUM | 16 | 16 | 41 | ○ | × |
| CAMERA 24 | MEDIUM | 16 | 16 | 41 | ○ | × |
| CAMERA 30 | LOW | 10 | 0 | 41 | × | ○ |
| CAMERA 31 | LOW | 16 | 16 | 41 | ○ | × |
| CAMERA 32 | LOW | 16 | 16 | 41 | ○ | × |

FIG. 15

|  | (1) IMAGE QUALITY | (2) TRANSMIT FRAME RATE FRAMES/SEC | (3) RECORD FRAME RATE FRAMES/SEC | (4) RECORD APPARATUS | (5) RECORD | (6) DISPLAY |
|---|---|---|---|---|---|---|
| CAMERA 10 | HIGH | 30 | 30 | 81 | ○ | ○ |
| CAMERA 11 | MEDIUM | 30 | 30 | 81 | ○ | × |
| CAMERA 12 | HIGH | 30 | 30 | 81 | ○ | ○ |
| CAMERA 13 | HIGH | 30 | 30 | 81 | ○ | ○ |
| CAMERA 14 | MEDIUM | 30 | 30 | 81 | ○ | × |
| CAMERA 15 | HIGH | 30 | 30 | 81 | ○ | ○ |
| CAMERA 16 | HIGH | 30 | 30 | 81 | ○ | ○ |
| CAMERA 17 | MEDIUM | 30 | 30 | 81 | ○ | × |
| CAMERA 20 | MEDIUM | 20 | 20 | 82 | ○ | ○ |
| CAMERA 21 | MEDIUM | 20 | 20 | 82 | ○ | ○ |
| CAMERA 22 | MEDIUM | 20 | 20 | 82 | ○ | × |
| CAMERA 23 | MEDIUM | 20 | 20 | 82 | ○ | × |
| CAMERA 24 | MEDIUM | 20 | 20 | 82 | ○ | × |
| CAMERA 30 | LOW | 10 | 0 | 83 | × | ○ |
| CAMERA 31 | LOW | 3 | 3 | 83 | ○ | × |
| CAMERA 32 | LOW | 3 | 3 | 83 | ○ | × |

FIG. 16

|  | (1) RECORDING CAPABILITY FRAMES/SEC | (2) USABLE RECORDING CAPACITY | (3) OPERATING CONDITION |
|---|---|---|---|
| RECORD APPARATUS 81 | 240 | 300 | 100 |
| RECORD APPARATUS 82 | 240 | 10 | 100 |
| RECORD APPARATUS 83 | 240 | 3 | 90 |

| | (1) RECORDING CAPABILITY FRAMES/SEC | (2) USABLE RECORDING CAPACITY | (3) OPERATING CONDITION |
|---|---|---|---|
| RECORD APPARATUS 81 | 240 | 10 | 90 |
| RECORD APPARATUS 82 | 240 | 100 | 100 |
| RECORD APPARATUS 83 | 240 | 300 | 100 |

FIG. 19

|  | (1) IMAGE QUALITY | (2) TRANSMIT FRAME RATE FRAMES/SEC | (3) RECORD FRAME RATE FRAMES/SEC | (4) RECORD APPARATUS | (5) RECORD | (6) DISPLAY |
|---|---|---|---|---|---|---|
| CAMERA 10 | HIGH | 30 | 30 | 82 | ○ | ○ |
| CAMERA 11 | MEDIUM | 30 | 30 | 82 | ○ | × |
| CAMERA 12 | HIGH | 30 | 30 | 82 | ○ | ○ |
| CAMERA 13 | HIGH | 30 | 30 | 82 | ○ | ○ |
| CAMERA 14 | MEDIUM | 30 | 30 | 81 | ○ | × |
| CAMERA 15 | HIGH | 30 | 30 | 81 | ○ | ○ |
| CAMERA 16 | HIGH | 30 | 30 | 81 | ○ | ○ |
| CAMERA 17 | MEDIUM | 30 | 30 | 81 | ○ | × |
| CAMERA 20 | MEDIUM | 20 | 20 | 82 | ○ | ○ |
| CAMERA 21 | MEDIUM | 20 | 20 | 82 | ○ | ○ |
| CAMERA 22 | MEDIUM | 20 | 20 | 82 | ○ | × |
| CAMERA 23 | MEDIUM | 20 | 20 | 82 | ○ | × |
| CAMERA 24 | MEDIUM | 20 | 20 | 82 | ○ | × |
| CAMERA 30 | LOW | 10 | 0 | 83 | × | ○ |
| CAMERA 31 | LOW | 3 | 3 | 83 | ○ | × |
| CAMERA 32 | LOW | 3 | 3 | 83 | ○ | × |

FIG. 20

|  | (1) RECORDING CAPABILITY FRAMES/SEC | (2) USABLE RECORDING CAPACITY | (3) OPERATING CONDITION |
|---|---|---|---|
| RECORD APPARATUS 81 | 240 | 10 | 100 |
| RECORD APPARATUS 82 | 240 | 100 | 90 |
| RECORD APPARATUS 83 | 240 | 300 | 90 |

VIDEO RECORDING CONTROL SYSTEM

BACKGROUND OF THE INVENTION

1. Field of the Invention

This invention generally relates to a video recording control system, and particularly relates to a system for controlling video cameras and video recorders connected by a network.

2. Description of the Related Art

There is a monitor system including a network of cameras, displays, video recorders, and a control apparatus. It is important to previously provide the monitor system with a countermeasure for the failure of at least one of the video recorders.

The video recorders have a limited recording capacity. Accordingly, to implement endless recording, each video recorder writes a new video signal portion over an old video signal portion in a recording medium. Thus, the old video signal portion is deleted from the recording medium. It is difficult to check the contents of the old video signal portion which has already been deleted from the recording medium.

Japanese patent application publication number 11-79621/1999 discloses a monitor system for an elevator which includes a television camera, a main video recorder, a backup video recorder, a failure detector, and a switch. Normally, a video signal generated by the television camera is sent to the main video recorder via the switch before being recorded by the main video recorder. The failure detector operates to detect when the main video recorder falls into a state of failing to record the video signal. In the event that the failure detector detects the occurrence of such a failure of the main video recorder, the switch is changed by the failure detector to send the video signal to the backup video recorder rather than the main video recorder. Thus, in this case, the video signal is recorded by the backup video recorder.

The backup video recorder causes an increase in cost of the monitor system.

SUMMARY OF THE INVENTION

It is a first object of this invention to provide an inexpensive video recording control system.

It is a second object of this invention to provide an efficient video recording control system.

A first aspect of this invention provides a video recording control system comprising a plurality of monitor cameras, a plurality of video recording apparatuses, a control apparatus, and a network connecting the monitor cameras, the video recording apparatuses, and the control apparatus. Each of the monitor cameras comprises (a1) image taking means for taking an image of a scene at a prescribed place and generating a video signal representing the taken image; and (a2) video transmitting means for sending the video signal generated by the image taking means to a prescribed video recording apparatus among the video recording apparatuses. Each of the video recording apparatuses comprises (b1) video receiving means for receiving a video signal sent by a prescribed monitor camera among the monitor cameras; (b2) video recording means for recording the video signal received by the video receiving means on a recording medium; and (b3) operating condition transmitting means for periodically transmitting operating condition notice information to the control apparatus or transmitting operating condition notice information to the control apparatus upon detection of a change in an operating condition, the operating condition notice information including at least one of (1) information representing that the related video recording apparatus is operating normally and (2) information representing a usable recording capacity of the recording medium. The control apparatus comprises (c1) a monitor camera information storage for storing monitor camera information representing a correspondence between the monitor cameras and the video recording apparatuses designated as destinations for recording the video signals generated by the monitor cameras; (c2) a video recording apparatus information storage for storing video recording apparatus information including information representing recording capabilities of the video recording apparatuses and information representing usable recording capacities of the video recording apparatuses; (c3) operation managing means for deciding that at least one of the video recording apparatuses fails to record a video signal in cases where the operating condition notice information from said one of the video recording apparatuses continues to be not received for longer than a prescribed time interval or the usable recording capacity of said one of the video recording apparatuses drops below a prescribed level; (c4) video recording apparatus deciding means for deciding a new video recording apparatus among the video recording apparatuses which should be a new destination for at least one video signal which has been assigned to the failed video recording apparatus decided by the operation managing means in response to the monitor camera information stored in the monitor camera information storage and the video recording apparatus information stored in the video recording apparatus information storage; (c5) commanding means for commanding the new video recording apparatus decided by the video recording apparatus deciding means to record said at least one video signal generated by at least one monitor camera corresponding in destination to the failed video recording apparatus decided by the operation managing means, and commanding said at least one monitor camera corresponding in destination to the failed video recording apparatus to change the destination to the new video recording apparatus; and (c6) information updating means for updating the monitor camera information stored in the monitor camera information storage and the video recording apparatus information stored in the video recording apparatus information storage in response to contents of the decision by the video recording apparatus deciding means.

A second aspect of this invention is based on the first aspect thereof, and provides a video recording control system wherein in cases where the failed video recording apparatus decided by the operation managing means has recorded two or more of the video signals generated by the monitor cameras, the video recording apparatus deciding means decides two or more new video recording apparatuses among the video recording apparatuses so as to decide a correspondence between the monitor cameras and the new video recording apparatuses for recording said two or more of the video signals which have corresponded to the failed video recording apparatus.

A third aspect of this invention is based on the first aspect thereof, and provides a video recording control system wherein the monitor camera information stored in the monitor camera information storage includes information representing transmission rates about the video signals generated by the monitor cameras, wherein the video recording apparatus deciding means makes a decision that the transmission rate about the video signal generated by at least one of the monitor cameras should be reduced and thereby deciding a new transmission rate, wherein the commanding means commands the monitor camera related with the transmission-rate-reduction decision to change the transmission rate to the new transmission rate, and wherein the information updating means updates the transmission rate information about the monitor camera related with the transmission-rate-reduction decision in accordance with the new transmission rate.

A fourth aspect of this invention is based on the first aspect thereof, and provides a video recording control system wherein the monitor camera information stored in the monitor camera information storage includes information representing qualities of the video signals generated by the monitor cameras, wherein the video recording apparatus deciding means makes a decision that the quality of the video signal generated by at least one of the monitor cameras should be reduced and thereby deciding a new quality, wherein the commanding means commands the monitor camera related with the quality-reduction decision to change the quality to the new quality, and wherein the information updating means updates the quality information about the monitor camera related with the quality-reduction decision in accordance with the new quality.

A fifth aspect of this invention provides a video recording control system comprising a plurality of monitor cameras, a plurality of video recording apparatuses, and a network connecting the monitor cameras and the video recording apparatuses. Each of the monitor cameras comprises (a1) image taking means for taking an image of a scene at a prescribed place and generating a video signal representing the taken image; and (a2) video transmitting means for sending the video signal generated by the image taking means to a prescribed video recording apparatus among the video recording apparatuses. Each of the video recording apparatuses comprises (b1) video receiving means for receiving a video signal sent by a prescribed monitor camera among the monitor cameras; (b2) video recording means for recording the video signal received by the video receiving means on a recording medium; (b3) operating condition transmitting means for periodically transmitting operating condition notice information to the other video recording apparatuses or transmitting operating condition notice information to the other video recording apparatuses upon detection of a change in an operating condition, the operating condition notice information including at least one of (1) information representing that the related video recording apparatus is operating normally and (2) information representing a usable recording capacity of the recording medium; (b4) a monitor camera information storage for storing monitor camera information representing a correspondence between the monitor cameras and the video recording apparatuses designated as destinations for recording the video signals generated by the monitor cameras; (b5) a video recording apparatus information storage for storing video recording apparatus information including information representing recording capabilities of the video recording apparatuses and information representing usable recording capacities of the video recording apparatuses; (b6) operation managing means for deciding that at least one of the video recording apparatuses fails to record a video signal in cases where the operating condition notice information from said one of the video recording apparatuses continues to be not received for longer than a prescribed time interval or the usable recording capacity of said one of the video recording apparatuses drops below a prescribed level; (b7) video recording apparatus deciding means for deciding whether or not the related video recording apparatus can be a new destination for at least one video signal which has been assigned to the failed video recording apparatus decided by the operation managing means in response to the monitor camera information stored in the monitor camera information storage and the video recording apparatus information stored in the video recording apparatus information storage; (b8) commanding means for, when the video recording apparatus deciding means decides that the related video recording apparatus can be a new destination for at least one video signal which has been assigned to the failed video recording apparatus, commanding at least one monitor camera corresponding in destination to the failed video recording apparatus to designate the present video recording apparatus as a new destination; (b9) information updating means for updating the monitor camera information stored in the monitor camera information storage and the video recording apparatus information stored in the video recording apparatus information storage in response to contents of the decision by the video recording apparatus deciding means; and (b10) updated contents notifying means for notifying the contents of the updating by the information updating means to the other video recording apparatuses.

A sixth aspect of this invention is based on the fifth aspect thereof, and provides a video recording control system wherein in cases where the failed video recording apparatus decided by the operation managing means has recorded two or more of the video signals generated by the monitor cameras, the video recording apparatus deciding means decides that the related video recording apparatus can be a new destination for said two or more of the video signals and the commanding means commands the monitor cameras, which have corresponded in destination to the failed video recording apparatus, to designate the present video recording apparatus as a new destination.

A seventh aspect of this invention provides a video recording control system comprising a plurality of monitor cameras generating video signals respectively; a plurality of video recording apparatuses; wherein the monitor cameras are assigned to the video recording apparatuses in a manner such that each of the video recording apparatuses corresponds to at least one assigned monitor camera, wherein each of the monitor cameras sends its video signal to the assigned one of the video recording apparatus, and wherein the video recording apparatuses record the video signals sent from the monitor cameras; first means for detecting a failure of each of the video recording apparatuses; and second means for, when the first means detects a failure of at least one of the video recording apparatuses, changing the assignment of the monitor cameras to the video recording apparatuses so that at least one of the monitor cameras which has been assigned to the failed video recording apparatus will be newly assigned to normal one of the video recording apparatuses.

An eighth aspect of this invention is based on the seventh aspect thereof, and provides a video recording control system wherein the second means comprises means for, when the first means detects a failure of at least one of the video recording apparatuses, changing the assignment of the monitor cameras to the video recording apparatuses so that at least first one of the monitor cameras which has been assigned to the failed video recording apparatus will be newly assigned to first normal one of the video recording apparatuses, and that at least second one of the monitor cameras which has been assigned to the failed video recording apparatus will be newly assigned to second normal one of the video recording apparatuses.

A ninth aspect of this invention is based on the seventh aspect thereof, and provides a video recording control system further comprising third means for, when the first means detects a failure of at least one of the video recording apparatuses, reducing a transmission rate about at least one of the video signals generated by the monitor cameras.

A tenth aspect of this invention is based on the seventh aspect thereof, and provides a video recording control system wherein the video recording apparatuses periodically output respective notice signals while operating normally, and the first means comprises (1) means for deciding whether or not each of the video recording apparatuses periodically outputs its notice signal, and (2) means for, when it is decided that at least one of the video recording apparatuses does not periodically output its notice signal, deciding that said one of the video recording apparatuses has failed.

An eleventh aspect of this invention is based on the seventh aspect thereof, and provides a video recording control system wherein the first means comprises means for detecting usable recording capacities of the respective video recording apparatuses; means for deciding whether or not each of the detected usable recording capacities is less than a prescribed level; and means for, when it is decided that one of the detected usable recording capacities is less than the prescribed level, deciding that the video recording apparatus having said one of the detected usable recording capacities has failed.

The video recording control system in this invention has the following advantages. The video recording control system dispenses with an exclusive backup video recorder. Therefore, the video recording control system is inexpensive. Furthermore, the video recording control system is efficient. In the event that at least one of video recording apparatuses fails, the recording of the video signals from all of monitor cameras can be maintained.

BRIEF DESCRIPTION OF THE DRAWINGS

FIG. 4 is a diagram showing an example of the contents of monitor camera information in the system of FIG. 1.

FIG. 5 is a diagram showing an example of the contents of video recording apparatus information in the system of FIG. 1.

FIG. 10 is a diagram of the functions of a video recording apparatus in a video recording control system according to a third embodiment of this invention.

FIG. 11 is a diagram showing an example of the contents of video recording apparatus information in a video recording control system according to a fourth embodiment of this invention.

FIG. 12 is a diagram showing an example of the contents of video recording apparatus information in a video recording control system according to a fifth embodiment of this invention.

FIG. 13 is a diagram showing an example of the contents of monitor camera information in the system of the fifth embodiment of this invention.

FIG. 15 is a diagram showing an example of the contents of monitor camera information in the system of FIG. 14.

FIG. 16 is a diagram showing an example of the contents of video recording apparatus information in the system of FIG. 14.

FIG. 19 is a diagram showing an example of the contents of monitor camera information in the system of the eighth embodiment of this invention.

FIG. 20 is a diagram showing an example of the contents of video recording apparatus information in a video recording control system according to a ninth embodiment of this invention.

DETAILED DESCRIPTION OF THE INVENTION

First Embodiment

Figure 1:
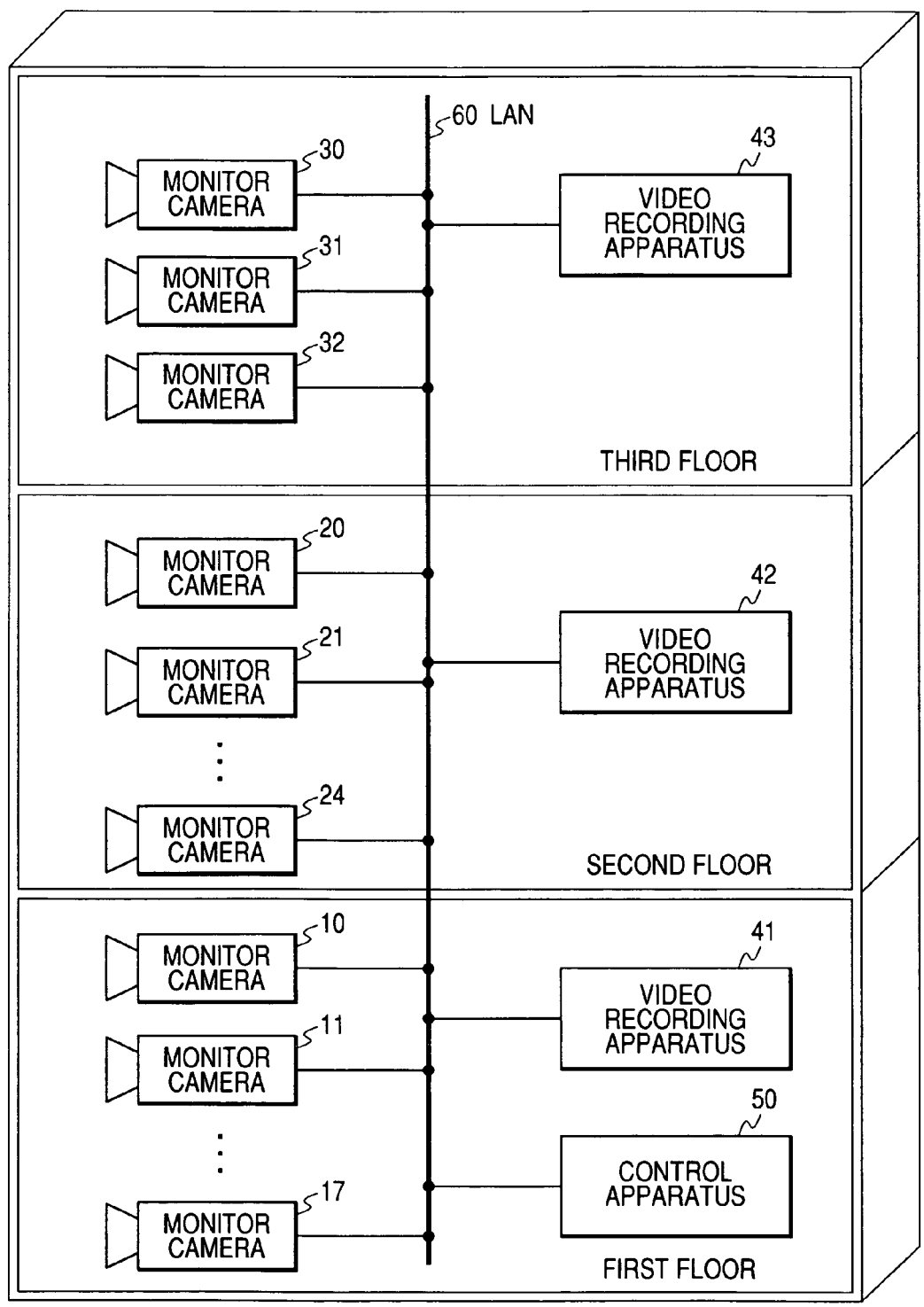
FIG. 1 is a diagram of a video recording control system according to a first embodiment of this invention.

FIG. 1 shows a video recording control system according to a first embodiment of this invention. The system of FIG. 1 is provided in a building having first, second, and third floors.

The system of FIG. 1 includes monitor cameras 10, 11, . . . , 17 located at prescribed positions on the first floor of the building, monitor cameras 20, 21, . . . , 24 located at prescribed positions on the second floor of the building, and monitor cameras 30, 31, and 32 located at prescribed positions on the third floor of the building. Each of the monitor cameras 10-32 uses, for example, a general-purpose network camera.

The monitor cameras 10-32 are connected with a LAN (local area network) 60 provided in the building. Video recording apparatuses 41, 42, and 43 are located on the first, second, and third floors of the building, respectively. Each of the video recording apparatuses 41-43 includes, for example, a general-purpose network video recorder, a network-connection DVD (digital versatile disc) recorder, a network-connection HDD (hard disc drive) recorder, a general-purpose computer, or a personal computer. The video recording apparatuses 41-43 are connected with the LAN 60.

The monitor cameras 10-32 are controlled by a control apparatus 50 which will be described later. Each of the monitor cameras 10-32 repetitively captures an image of the scene in front thereof, and generates a video signal representing the captured image. Each of the monitor cameras 10-32 outputs the generated video signal to the LAN 60. The outputted video signal propagates along the LAN 60. The outputted video signal is directed to a destination decided or changed in response to a command from the control apparatus 50.

Normally, the monitor cameras 10-17 are assigned to the video recording apparatus 41. The monitor cameras 20-24 are assigned to the video recording apparatus 42. The monitor cameras 30-32 are assigned to the video recording apparatus 43. Normally, the video signals are sent from the monitor cameras 10-17 to the video recording apparatus 41. The video signals are sent from the monitor cameras 20-24 to the video recording apparatus 42. The video signals are sent from the monitor cameras 30-32 to the video recording apparatus 43.

The video recording apparatuses 41-43 are controlled by the control apparatus 50. Normally, the video recording apparatus 41 receives the video signals from the monitor cameras 10-17 via the LAN 60, and records the received video signals. The video recording apparatus 41 can receive the video signals from other monitor cameras via the LAN 60, and record at least one of the received video signals in response to a command from the control apparatus 50. The video recording apparatus 41 includes a display for indicating the images represented by at least one of the received video signals. Normally, the video recording apparatus 42 receives the video signals from the monitor cameras 20-24 via the LAN 60, and records the received video signals. The video recording apparatus 42 can receive the video signals from other monitor cameras via the LAN 60, and record at least one of the received video signals in response to a command from the control apparatus 50. The video recording apparatus 42 includes a display for indicating the images represented by at least one of the received video signals. Normally, the video recording apparatus 43 receives the video signals from the monitor cameras 30-32 via the LAN 60, and records the video signals from the monitor cameras 31 and 32. The video recording apparatus 43 can receive the video signals from other monitor cameras via the LAN 60, and record at least one of the received video signals in response to a command from the control apparatus 50. The video recording apparatus 43 includes a display for indicating the images represented by at least one of the received video signals.

Preferably, the video signal generated by each of the monitor cameras 10-32 is of the JPEG (Joint Photograph Expert Group) format. A procedure of the generation of the video signal by each of the monitor cameras 10-32 includes a step of compressing the original signal at a rate variable among first, second, and third prescribed values. When the compression rate is set to the first prescribed value, the quality (resolution) of the generated video signal is "low". When the compression rate is set to the second prescribed value, the quality (resolution) of the generated video signal is "medium". When the compression rate is set to the third prescribed value, the quality (resolution) of the generated video signal is "high".

It should be noted that the video signal generated by each of the monitor cameras 10-32 may be of a given format different from the JPEG format. In addition, the quality (resolution) of the video signal generated by each of the monitor cameras 10-32 may be fixed.

The control apparatus 50 is located on the first floor of the building. The control apparatus 50 is connected with the LAN 60. The control apparatus 50 serves as a controller for governing the monitor cameras 10-32 and the video recording apparatuses 41-43.

It should be noted that the control apparatus 50 may be located on the second or third floor of the building. Alternatively, the control apparatus 50 may be located outside the building. The control apparatus 50 may be connected with the LAN 60 via a global network such as the Internet. In this case, a suitable interface is provided between the LAN 60 and the global network.

As understood from the above description, the monitor cameras 10-32, the video recording apparatuses 41-43, and the control apparatus 50 are connected by the LAN 60. Signals and commands can be transmitted among the monitor cameras 10-32, the video recording apparatuses 41-43, and the control apparatus 50 via the LAN 60 according to a conventional LAN communication scheme. Preferably, different addresses (or different ID code words) are given to the monitor cameras 10-32, the video recording apparatuses 41-43, and the control apparatus 50, respectively. Thus, the monitor cameras 10-32, the video recording apparatuses 41-43, and the control apparatus 50 can be identified according to the addresses (or the ID code words). Each of the monitor cameras 10-32, the video recording apparatuses 41-43, and the control apparatus 50 has a memory storing its address (or its ID code word). Arbitrary ones of the monitor cameras 10-32, the video recording apparatuses 41-43, and the control apparatus 50 can be a sender and a recipient (a destination). In this case, a signal or a command having a combination of the address of the sender, the address of the recipient, and the payload (the contents) is transmitted from the sender to the recipient.

Figure 2:
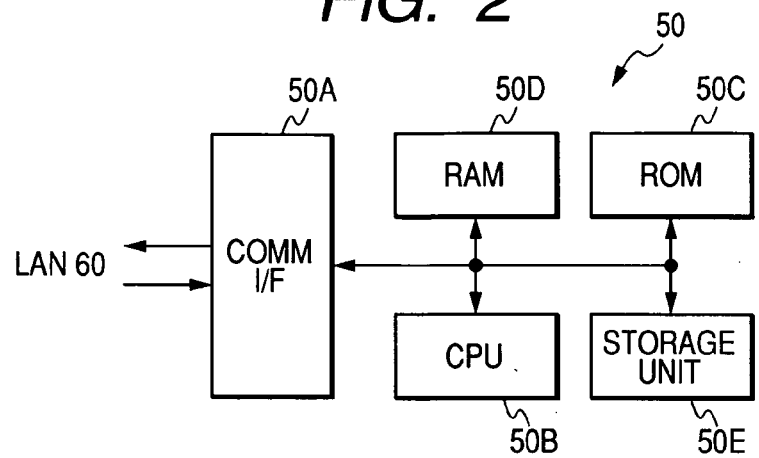
FIG. 2 is a block diagram of a control apparatus in FIG. 1.

The control apparatus 50 includes, for example, a general-purpose computer or a personal computer. As shown in FIG. 2, an example of the control apparatus 50 includes a computer having a combination of a communication interface (an input/output port) 50A, a CPU 50B, a ROM 50C, a RAM 50D, and a storage unit 50E. The communication interface 50A is connected with the LAN 60. The control apparatus 50 operates in accordance with a computer program stored in the ROM 50C, the RAM 50D, or the storage unit 50E. The computer program is designed to enable the control apparatus 50 to carry out operation steps mentioned hereafter.

Figure 3:
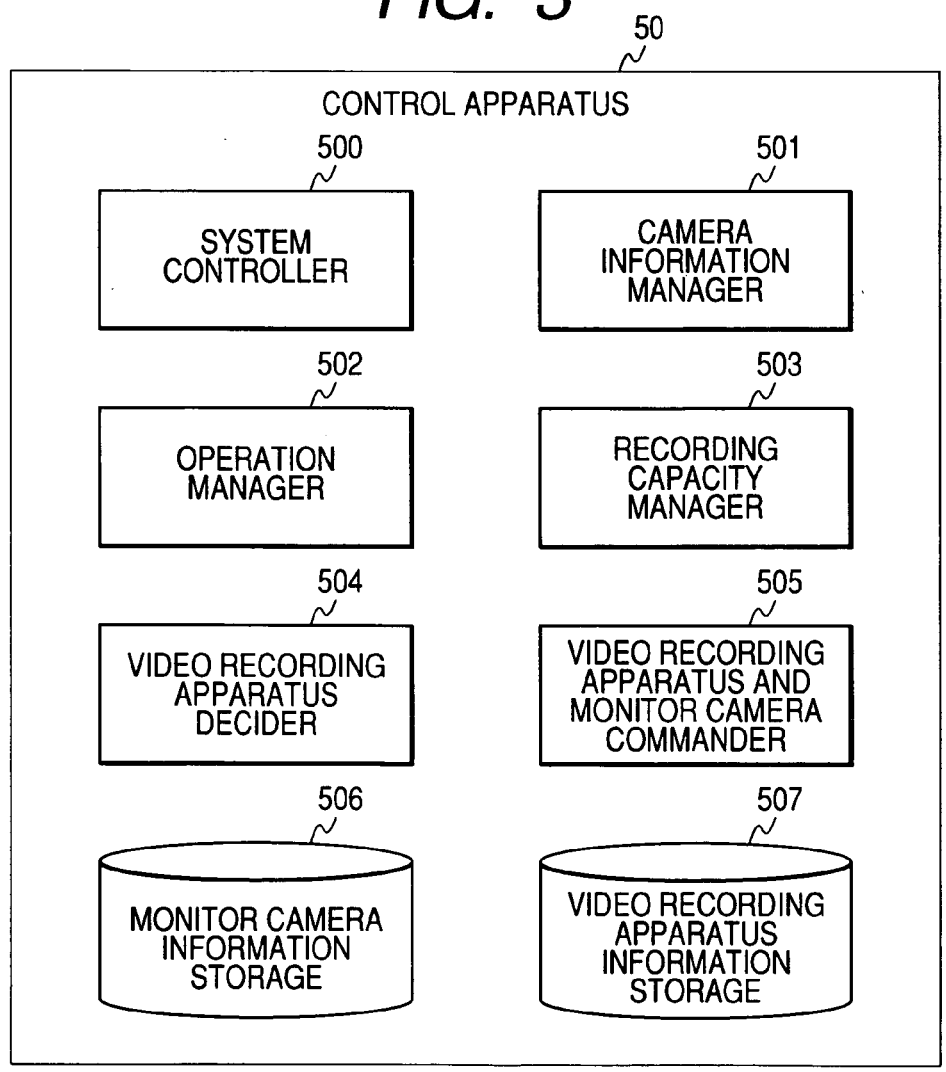
FIG. 3 is a diagram of the functions of the control apparatus in FIG. 1.

FIG. 3 shows the blocks of the functions of the control apparatus 50 rather than the hardware structure thereof. With reference to FIG. 3, the blocks of the functions of the control apparatus 50 include a system controller 500, a camera information manager 501, an operation manager 502, a recording capacity manager 503, a video recording apparatus decider 504, a video recording apparatus and monitor camera commander 505, a monitor camera information storage 506, and a video recording apparatus information storage 507.

The system controller 500 implements main signal processing and control performed by the control apparatus 50. The system controller 500 corresponds to the CPU 50B in FIG. 2.

The camera information manager 501 detects the correspondence relation among the monitor cameras 10-32 and the video recording apparatuses 41-43, and the conditions of the monitor cameras 10-32 by referring to monitor camera information stored in the monitor camera information storage 506. The correspondence relation means which of the video recording apparatuses 41-43 each of the monitor cameras 10-32 is sending its video signal to. When the correspondence relation or the conditions of the monitor cameras 10-32 change, the camera information manager 501 updates the monitor camera information in the monitor camera information storage 506 accordingly. The camera information manager 501 corresponds to the CPU 50B in FIG. 2 while the monitor camera information storage 506 corresponds to the RAM 50D or the storage unit 50E in FIG. 2.

The operation manager 502 receives operating condition notice information from the video recording apparatuses 41-43. The operating condition notice information represents the operating conditions of the video recording apparatuses 41-43. The operation manager 502 decides whether or not each of the video recording apparatuses 41-43 is in a state of failing to record the video signals on the basis of the received operating condition notice information. In accordance with the results of the decision, the operation manager 502 updates video recording apparatus information stored in the video recording apparatus information storage 507. The operating condition notice information is sent from an operation manager in each of the video recording apparatuses 41-43 toward the control apparatus 50. The operation manger 502 corresponds to the communication interface 50A and the CPU 50B in FIG. 2 while the video recording apparatus information storage 507 corresponds to the RAM 50D or the storage unit 50E in FIG. 2.

For example, each of the video recording apparatuses 41-43 periodically sends the operating condition notice information toward the control apparatus 50. In the absence of the received operating condition notice information from at least one of the video recording apparatuses 41-43 during a prescribed length of time or longer, the control apparatus 50 decides that the video recording apparatus in question is wrong. Otherwise, the control apparatus 50 decides that the video recording apparatuses 41-43 are normal.

When a usable recording capacity (a remaining recording capacity) in each of the video recording apparatuses 41-43 drops below a prescribed level (a critical level), the video recording apparatus sends corresponding operating condition notice information to the control apparatus 50. Therefore, the control apparatus 50 can obtain knowledge about the usable recording capacity in each of the video recording apparatuses 41-43 by referring to the operating condition notice information sent therefrom. The operating condition notice information represents a variation in the operating condition of each of the video recording apparatuses 41-43 as viewed along a time base.

The operating condition notice information sent from each of the video recording apparatuses 41-43 to the control apparatus 50 may contain a piece representing the usable recording capacity in the video recording apparatus. In this case, the control apparatus 50 can detect the usable recording capacity in each of the video recording apparatuses 41-43 by referring to the operating condition notice information sent therefrom. The operating condition notice information represents a variation in the operating condition of each of the video recording apparatuses 41-43 as viewed along a time base.

When the information representing the usable recording capacity in each of the video recording apparatuses 41-43 is received therefrom, the recording capacity manager 503 updates the video recording apparatus information in the video recording apparatus information storage 507 in accordance with the usable recording capacity. The recording capacity manager 503 corresponds to the CPU 50B in FIG. 2.

The video recording apparatus decider 504 detects the recording performance and the operating condition of each of the video recording apparatuses 41-43, and the usable recording capacity in each of the video recording apparatuses 41-43 by referring to the monitor camera information in the monitor camera information storage 506 and the video recording apparatus information in the video recording apparatus information storage 507. The video recording apparatus decider 504 decides whether or not each of the video recording apparatuses 41-43 is wrong on the basis of the operating condition notice information therefrom or the video recording apparatus information in the video recording apparatus information storage 507. Furthermore, the video recording apparatus decider 504 decides whether or not the usable recording capacity in each of the video recording apparatuses 41-43 drops below the prescribed level on the basis of the operating condition notice information therefrom or the video recording apparatus information in the video recording apparatus information storage 507. When one of the video recording apparatuses 41-43 is wrong or when the usable recording capacity in one of the video recording apparatuses 41-43 drops below the prescribed level, the video recording apparatus decider 504 decides which of others of the video recording apparatuses 41-43 can take over the recording of the video signals from the video recording apparatus in question on the basis of the monitor camera information in the monitor camera information storage 506 and the video recording apparatus information in the video recording apparatus information storage 507. The video recording apparatus decider 504 corresponds to the CPU 50B in FIG. 2.

The video recording apparatus and monitor camera commander 505 can send each of the monitor cameras 10-32 a command to change the related destination on the basis of the monitor camera information in the monitor camera information storage 506, the video recording apparatus information in the video recording apparatus information storage 507, and the results of the decisions by the video recording apparatus decider 504. Furthermore, the video recording apparatus and monitor camera commander 505 can send each of the video recording apparatuses 41-43 a command to also receive the video signal from a monitor camera other than the related monitor cameras and record the received video signal on the basis of the monitor camera information in the monitor camera information storage 506, the video recording apparatus information in the video recording apparatus information storage 507, and the results of the decisions by the video recording apparatus decider 504. The video recording apparatus and monitor camera commander 505 corresponds to the communication interface 50A and the CPU 50B in FIG. 2.

FIG. 4 shows an example of the contents of the monitor camera information in the monitor camera information storage 506. In FIG. 4, the monitor camera information is expressed as a table having rows assigned to the monitor cameras 10-32 respectively. With reference to FIG. 4, for each of the monitor cameras 10-32, the monitor camera information represents (1) the quality of images (the resolution of frames) captured by the monitor camera, (2) the number of frames sent from the monitor camera per second, (3) the number of frames to be recorded per second, (4) a video recording apparatus being a destination to which the video signal from the monitor camera is directed, (5) whether or not the recording of the video signal sent from the monitor camera should be recorded by the destination video recording apparatus, and (6) whether or not the images represented by the video signal sent from the monitor camera should be indicated by the display in the destination video recording apparatus.

In FIG. 4, regarding the information item (4), the destination video recording apparatus is denoted by the reference numeral "41", "42", or "43" (in fact, the address thereof). Regarding the information item (5), the character "◯" denotes that the video signal should be recorded while the character "X" denotes that the video signal should not be recorded. Similarly, regarding the information item (6), the character "◯" denotes that the images should be indicated while the character "X" denotes that the images should not be indicated.

The control apparatus 50 controls the monitor cameras 10-32 and the video recording apparatuses 41-43 in response to the monitor camera information in FIG. 4. For example, the control apparatus 50 controls the monitor camera 10 and the video recording apparatus 41 in response to the row of the table of the monitor camera information which is assigned to the monitor camera 10. Specifically, by referring to the row of the table, the control apparatus 50 commands the monitor camera 10 to send 30 high-quality frames to the video recording apparatus 41 per second. In addition, the control apparatus 50 commands the video recording apparatus 41 to receive the video signal from the monitor camera 10 and record 30 frames of the received video signal per second and indicate the frames on the display. Similarly, by referring to the other rows of the table, the control apparatus 50 issues commands to the other monitor cameras 11-32 and the video recording apparatuses 41-43.

FIG. 5 shows an example of the contents of the video recording apparatus information in the video recording apparatus information storage 507. In FIG. 5, the video recording apparatus information is expressed as a table having rows assigned to the video recording apparatuses 41-43 respectively. With reference to FIG. 5, for each of the video recording apparatuses 41-43, the video recording apparatus information represents (1) the recording capability of the video recording apparatus, (2) the usable recording capacity (the remaining recording capacity) in the video recording apparatus, and (3) the operating condition of the video recording apparatus.

In FIG. 5, regarding the information item (1), the recording capability is expressed by the maximum number of frames which can be recorded by the video recording apparatus per second. Regarding the information item (2), the usable recording capacity is expressed by the number of recordable frames or in unit of megabytes. Regarding the information item (3), the operating condition of the video recording apparatus is expressed by a variable integer called an operating condition value. The operating condition value can be used for deciding whether or not the video recording apparatus is operating normally.

Normally, each of the video recording apparatuses 41-43 periodically sends the operating condition notice information toward the control apparatus 50. Upon the reception of the operating condition notice information from the video recording apparatus 41, 42, or 43, the control apparatus 50 increments the related operating condition value by "1". Normally, the control apparatus 50 periodically updates the operating condition values while periodically receiving the operation condition notice information from the video recording apparatuses 41-43. The control apparatus 50 decides whether or not the operation condition value related to each of the video recording apparatus 41-43 is periodically updated. When it is decided that the operation condition value related to one of the video recording apparatuses 41-43 is not periodically updated, the control apparatus 50 concludes the video recording apparatus in question to be wrong.

It should be noted that the time of the last reception of the operating condition notice information from each of the video recording apparatuses 41-43 may be written in the related information item (3) in FIG. 5. In this case, the control apparatus 50 calculates the difference between the present time and the time of the last reception of the operating condition notice information from each of the video recording apparatuses 41-43. Then, the control apparatus 50 decides whether or not the operating condition notice information is periodically sent from each of the video recording apparatus 41-43 on the basis of the calculated difference. When it is decided that the operating condition notice information is not periodically sent from one of the video recording apparatus 41-43, the control apparatus 50 concludes the video recording apparatus in question to be wrong.

Preferably, the monitor cameras 10-32 are similar in function and structure. Accordingly, only the monitor camera 10 will be described below in more detail.

Figure 6:
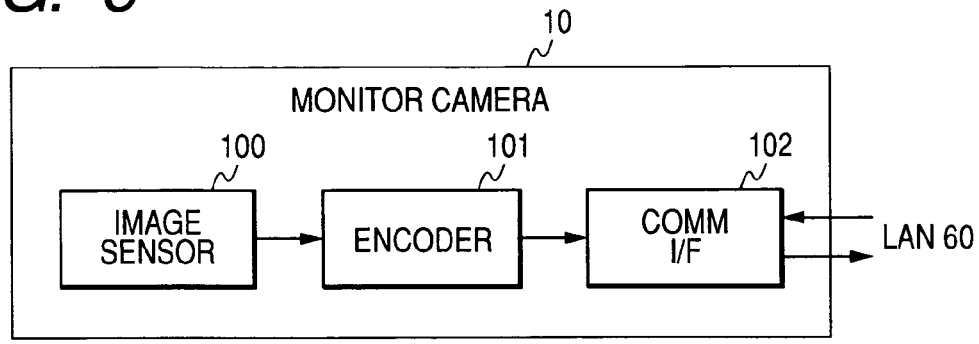
FIG. 6 is a block diagram of a monitor camera in FIG. 1.

As shown in FIG. 6, the monitor camera 10 includes an image sensor 100, an encoder 101, and a communication interface 102 which are successively connected in that order. The communication interface 102 is connected with the LAN 60.

The image sensor 100 repetitively captures an image of the scene in front thereof, and outputs a first video signal representative of the captured image to the encoder 101. The device 101 encodes the first video signal into a second video signal of a prescribed format such as a JPEG format. The encoder 101 outputs the second video signal to the communication interface 102. The communication interface 102 converts the second video signal into a third video signal of a prescribed transmission format through signal processing such as packeting. The communication interface 102 sends the third video signal to a destination via the LAN 60.

The communication interface 102 receives commands from the control apparatus 50 via the LAN 60. The monitor camera 10 is controlled in response to the received commands. Specifically, the destination to which the third video signal is directed can be decided or changed by the communication interface 102 in response to a command from the control apparatus 50. The quality of images represented by the third video signal is decided by, for example, a command from the control apparatus 50. The number of frames of the third video signal per second is decided by, for example, a command from the control apparatus 50.

Preferably, the video recording apparatus 41-43 are similar in function and structure. Accordingly, only the video recording apparatus 41 will be described below in more detail.

Figure 7:
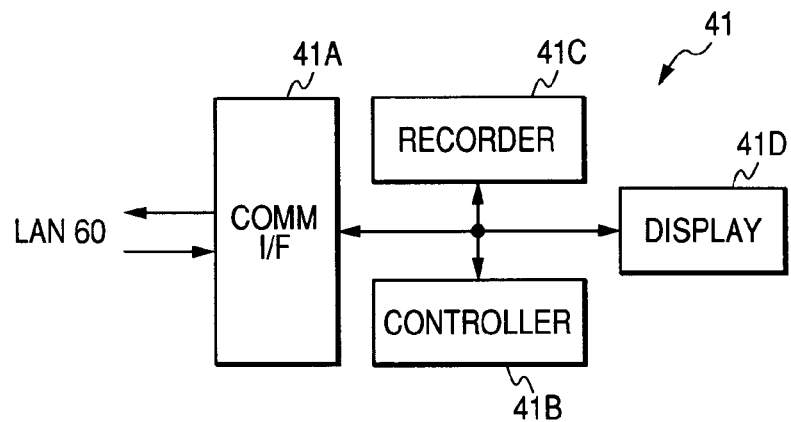
FIG. 7 is a block diagram of a video recording apparatus in FIG. 1.

As shown in FIG. 7, the video recording apparatus 41 has a combination of a communication interface 41A, a controller 41B, a recorder 41C, and a display 41D. The communication interface 41A is connected with the LAN 60. The controller 41B includes a microcomputer, a CPU, or a similar device which has a combination of a processing section, a ROM, and a RAM, and which operates in accordance with a computer program stored in the ROM or the RAM. The computer program is designed to enable the video recording apparatus 41 to carry out the previously-mentioned operation steps and also operation steps mentioned later. The controller 41B controls the communication interface 41A, the recorder 41C, and the display 41D. The recorder 41C includes a recording medium and a drive therefor. The recording medium is, for example, a magnetic tape, an optical disc, or a hard disc.

The communication interface 41A receives video signals via the LAN 60 which are directed to the video recording apparatus 41. The communication interface 41A passes the received video signals to the recorder 41C and the display 41D while being controlled by the controller 41B. The device 41C records the video signals on the recording medium while being controlled by the controller 41B. The display 41D visualizes the video signals while being controlled by the controller 41B.

The communication interface 41A can receive commands via the LAN 60 which are directed to the video recording apparatus 41. The communication interface 41A passes the received commands to the controller 41B. The controller 41B controls the recorder 41C and the display 41D in accordance with the commands.

The recorder 41C generates information representing a usable recording capacity (a remaining recording capacity) in the recording medium. The recorder 41C generates information indicative of an operating condition thereof. The recorder 41C feeds the usable recording capacity information and the operating condition information to the controller 41B. The controller 41B generates operating condition notice information on the basis of the usable recording capacity information and the operating condition information. The controller 41B controls the communication interface 41A to periodically send the operating condition notice information toward the control apparatus 50 via the LAN 60.

Figure 8:
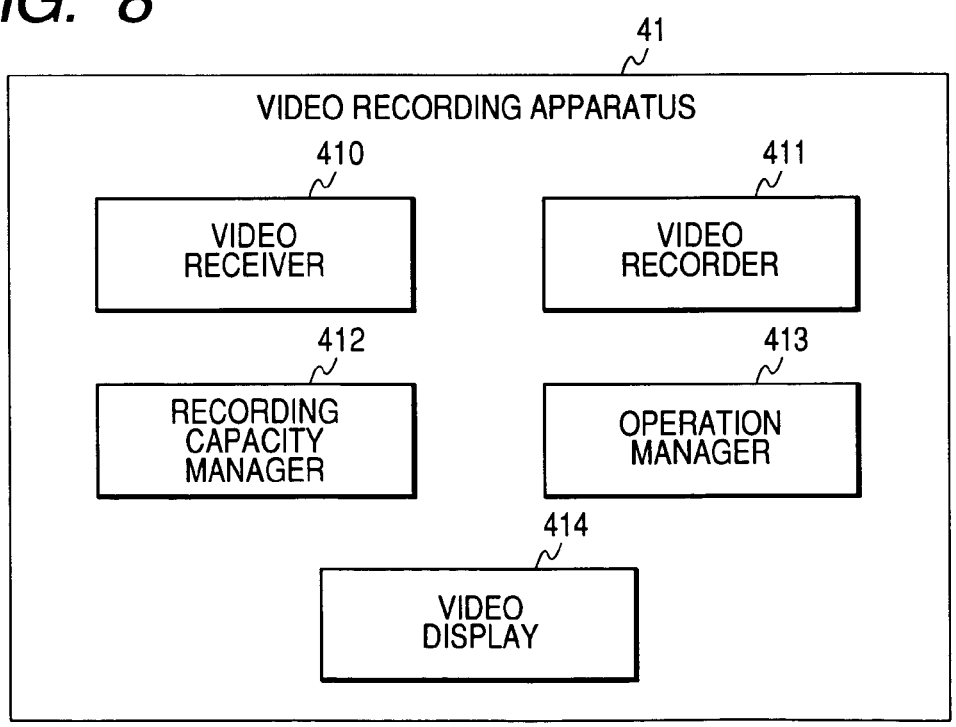
FIG. 8 is a diagram of the functions of the video recording apparatus in FIG. 1.

FIG. 8 shows the blocks of the functions of the video recording apparatus 41 rather than the hardware structure thereof. With reference to FIG. 8, the blocks of the functions of the video recording apparatus 41 include a video receiver 410, a video recorder 411, a recording capacity manager 412, an operation manager 413, and a video display 414.

The video receiver 410 receives the video signals from the monitor cameras 10-32. The video receiver 410 passes the received video signals to the video recorder 411 and the video display 414. The video receiver 410 corresponds to the communication interface 41A in FIG. 7. The video recorder 411 records the video signals from the monitor cameras 10-32 on a recording medium such as a magnetic tape, an optical disc, or a hard disc. The video recorder 411 corresponds to the recorder 41C in FIG. 7.

The video recorder 411 may select ones among the video signals from the monitor cameras 10-32 in response to a command from the control apparatus 50. In this case, the video recorder 411 records only the selected video signals on the recording medium. Normally, the video recorder 411 records only the video signals from the monitor cameras 10-17 on the recording medium. The above-mentioned selection of ones among the video signals from the monitor cameras 10-32 is implemented by the controller 41B in FIG. 7.

The recording capacity manager 412 detects the usable recording capacity (the remaining recording capacity) in the recording medium within the video recorder 411. The recording capacity manager 412 compares the detected usable recording capacity with a prescribed level (a critical level). The recording capacity manager 412 notifies the operation manager 413 when the usable recording capacity drops below the prescribed level. The recording capacity manager 412 may notify the operation manager 413 of the usable recording capacity. The recording capacity manager 412 corresponds to the controller 41B in FIG. 7.

The operation manager 413 sends information representing the operating condition of the video recording apparatus 41. This information is referred to as the operating condition notice information. The operating condition notice information includes, for example, (1) periodically transmitted information, (2) information representing that the usable recording capacity drops below the prescribed level, and (3) information representing the usable recording capacity. The operating manager 413 corresponds to the controller 41B and the communication interface 41A in FIG. 7.

The video display 414 indicates the images represented by the video signals received by the video receiver 410. According to a first example, the screen of the video display 414 is divided into areas for indicating the images represented by the video signals respectively. According to a second example, the video display 414 indicates the images represented by the video signals on a time sharing basis. The video display 414 corresponds to the display 41D in FIG. 7.

The video display 414 may select ones among the video signals from the monitor cameras 10-32 in response to a command from the control apparatus 50. In this case, the video display 414 indicates only the images represented by the selected video signals. Normally, the video display 414 indicates only the images represented by the video signals from the monitor cameras 10-17. The above-mentioned selection of ones among the video signals from the monitor cameras 10-32 is implemented by the controller 41B in FIG. 7.

The control apparatus 50 operates as follows. The control apparatus 50 always monitors the video recording apparatuses 41-43. Specifically, the control apparatus 50 always checks whether or not the video recoding apparatuses 41-43 are operating normally, that is, whether or not the video recording apparatuses 41-43 are able to record the video signals. In more detail, for each of the video recording apparatuses 41-43, the operation manager 502 in the control apparatus 50 always refers to the operating condition item (3) of the video recording apparatus information which is normally updated on the basis of the operating condition notice information. The operation manager 502 always decides whether or not each of the video recording apparatuses 41-43 is able to record the video signals on the basis of the operating condition item (3) of the video recording apparatus information.

In the event that the operating condition item (3) of the video recording apparatus information about the video recording apparatus 43 remains not updated and hence takes a value smaller than others for the video recording apparatuses 41 and 42 as shown in FIG. 5, the operation manager 502 decides that the video recording apparatus 43 is wrong and is not operating normally. In this case, the operation manager 502 notifies the system controller 500 in the control apparatus 50 that the video recording apparatus 43 has failed.

Then, the system controller 500 inquires of the video recording apparatus decider 504 in the control apparatus 50 as to the video recording condition of the video recording apparatus 43, specifically, the details of the video recording operation of the video recording apparatus 43 which occurs before the failure. In response to the inquiry, the video recording apparatus decider 504 refers to the monitor camera information in the monitor camera information storage 506 within the control apparatus 50. For example, the video recording apparatus decider 504 detects from the monitor camera information that the video recording apparatus 43 has received 3 JPEG frames from each of the monitor cameras 31 and 32 per second, and has recorded 6 JPEG frames in total per second before the failure. Furthermore, the video recording apparatus decider 504 detects that the video recording apparatus 42 is receiving 20 JPEG frames from each of the monitor cameras 20-24 per second, and is recording 100 JPEG frames in total per second.

In addition, the video recording apparatus decider 504 refers to the video recording apparatus information in the video recording apparatus information storage 507. The video recording apparatus decider 504 detects from the video recording apparatus information that each of the video recording apparatuses 41-43 has the capability of recording up to 240 JPEG frames per second. On the basis of the results of the detections, the video recording apparatus decider 504 judges that the video recording apparatus 42 can further record 140 JPEG frames per second and take over the recording of 6 JPEG frames per second by the video recording apparatus 43.

As a response to the inquiry, the video recording apparatus decider 504 notifies the system controller 500 of the judgment contents which represent that the video signals from the monitor cameras 31 and 32 can be recorded by the normal video recording apparatus 42 instead of the failed video recording apparatus 43. On the basis of the contents of the judgment by the video recording apparatus decider 504, the system controller 500 determines a new video recording schedule designed to force the normal video recording apparatus 42 to record the video signals from the monitor cameras 31 and 32. The system controller 500 notifies the video recording apparatus and monitor camera commander 505 of the new video recording schedule.

According to the new video recording schedule, the video recording apparatus and monitor camera commander 505 commands the monitor cameras 30-32 to send the video signals to the normal video recording apparatus 42 instead of the failed video recording apparatus 43. In addition, the video recording apparatus and monitor camera commander 505 commands the normal video recording apparatus 42 to receive the video signals from the monitor cameras 30-32 and record the video signals from the monitor cameras 31 and 32 at a rate of 3 frames per second, and indicate the images represented by the video signal from the monitor camera 30. The indication of the images is implemented by the video display 414 in the video recording apparatus 42.

At this time, each of the monitor cameras 30-32 changes the destination from the failed video recording apparatus 43 to the normal video recording apparatus 42 in response to the command from the control apparatus 50 (the video recording apparatus and monitor camera commander 505). Preferably, the command from the control apparatus 50 includes the address of the video recording apparatus 42, and each of the monitor cameras 30-32 implements the change of the destination in accordance with the address of the video recording apparatus 42.

The video recording apparatus 42 responds to the command from the control apparatus 50 (the video recording apparatus and monitor camera commander 505), thereby receiving the video signals from the monitor cameras 30-32 and starting the recording of the video signals from the monitor cameras 31 and 32 on the recording medium and the indication of the images represented by the video signal from the monitor camera 30. The indication of the images is implemented by the video display 414 in the video recording apparatus 42.

The system controller 500 updates the monitor camera information in the monitor camera information storage 506 and the video recording apparatus information in the video recording apparatus information storage 507 in accordance with the new video recording schedule. Then, the control apparatus 50 returns to the state of monitoring the video recording apparatuses 41-43.

A disconnection in the LAN 60 may cause the video recording apparatuses 41-43 to fall into the state of failing to record the video signals from the related monitor cameras 10-32. Preferably, the control apparatus 50 detects whether or not the video recording apparatuses 41-43 have recovered from the wrong states. In this case, when the video recording apparatuses 41-43 have recovered, the control apparatus 50 reassigns rates of JPEG frames recorded per second to the video recording apparatuses 41-43 according to the conditions of the recovery thereof.

Figure 9:
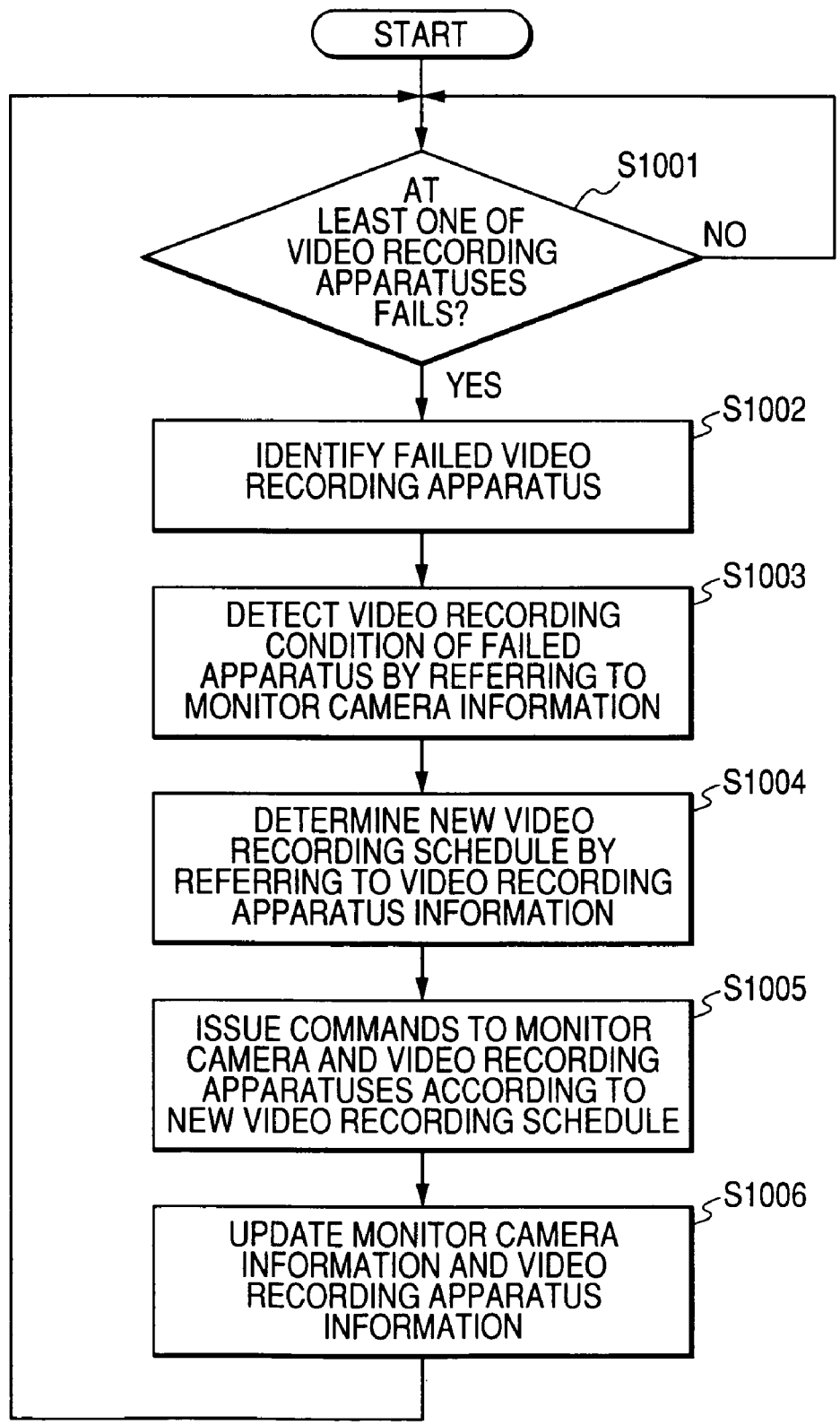
FIG. 9 is a flowchart of a computer program for the control apparatus in FIG. 1.

As previously mentioned, the control apparatus 50 operates in accordance with a computer program stored therein. FIG. 9 is a flowchart of the computer program.

With reference to FIG. 9, a first step S1001 of the program decides whether or not at least one of the video recording apparatuses 41-43 is wrong by referring to the operating condition item (3) of the video recording apparatus information for each of the video recording apparatuses 41-43. When at least one of the video recording apparatuses 41-43 is wrong, the program advances from the step S1001 to a step S1002. Otherwise, the step S1001 is repeated.

The step S1002 identifies the wrong one among the video recording apparatuses 41-43.

A step S1003 following the step S1002 detects the video recording condition of the wrong video recording apparatus, which occurs before the failure, from the monitor camera information.

A step S1004 subsequent to the step S1003 detects a surplus recording capability of each of normal ones of the video recording apparatuses 41-43 from the related video recording apparatus information and the monitor camera information. On the basis of the video recording condition of the wrong video recording apparatus and the surplus recording capabilities of the normal video recording apparatuses, the step S1004 decides and selects one among the normal video recording apparatuses as a successor to the wrong video recording apparatus. Then, the step S1004 determines a new video recording schedule designed to force the successor video recording apparatus to record the video signals from the monitor cameras which have been assigned to the wrong video recording apparatus.

A step S1005 following the step S1004 commands the monitor cameras, which have been assigned to the wrong video recording apparatus, to send the video signals to the successor video recording apparatus according to the new video recording schedule. In addition, the step S1005 commands the successor video recording apparatus to receive the video signals from the newly-assigned monitor cameras and record designated one or ones of the received video signals, and indicate the images represented by designated one or ones of the received video signals.

A step S1006 subsequent to the step S1005 updates the monitor camera information and the video recording apparatus information in accordance with the new video recording schedule. After the step S1006, the program returns to the step S1001.

As understood from the above description, the control apparatus 50 manages the video recording schedule for the monitor cameras 10-32 and the video recording apparatuses 41-43. The control apparatus 50 always checks whether or not at least one of the video recording apparatuses 41-43 falls into a state of failing to record the video signals. When one of the video recording apparatuses 41-43 fails, the control apparatus 50 forces one of the normal video recording apparatuses to take over the recording by the wrong video recording apparatus in the light of the video recording conditions of all the video recording apparatuses 41-43. To implement the takeover, the control apparatus 50 issues related commands (inclusive of destination changing commands) to the monitor cameras 10-32 and the video recording apparatuses 41-43. Therefore, even in the event that one of the video recording apparatuses 41-43 fails, the recording of the video signals from all the monitor cameras 10-32 except the monitor camera 30 can be maintained.

Second Embodiment

A second embodiment of this invention is similar to the first embodiment thereof except for design changes described hereafter.

According to the second embodiment of this invention, the communication interface 102 in the monitor camera 10 can receive a video request from each of the video recording apparatuses 41-43 via the LAN 60. The communication interface 102 sends the video signal to a destination identical with the video recording apparatus which makes the video request. The communication interfaces in the monitor cameras 11-32 are similar to the communication interface 102.

The communication interface 41A (the video receiver 410) in the video recording apparatus 41 can send a video request toward desired ones of the monitor cameras 10-32 via the LAN 60 while being controlled by the controller 41B. The communication interfaces in the video recording apparatuses 42 and 43 are similar to the communication interface 41A.

The video recording apparatus and monitor camera commander 505 in the control apparatus 50 can send each of the video recording apparatuses 41-43 a command to receive the video signals from newly-assigned ones of the monitor cameras 10-32. In addition, the video recording apparatus and monitor camera commander 505 can send each of the video recording apparatuses 41-43 information for identifying the newly-assigned ones of the monitor cameras 10-32. The identifying information may be contained in the command.

Basically, the control apparatus 50 does not issue commands to the monitor cameras 10-32. On the other hand, the control apparatus 50 issues commands to the video recording apparatuses 41-43. Each of the video recording apparatuses 41-43 detects, in response to the command from the control apparatus 50, ones among the monitor cameras 10-32 which are assigned thereto. Then, each of the video recording apparatuses 41-43 issues a video request to the assigned ones of the monitor cameras 10-32. Furthermore, each of the video recording apparatuses 41-43 sends the assigned monitor cameras a command to set the quality of the video signal and the rate of the transmission of frames per second.

As previously mentioned, the control apparatus 50 issues commands to the video recording apparatuses 41-43. Then, the video recording apparatuses 41-43 issues video requests and commands to the monitor cameras 10-32.

Third Embodiment

A third embodiment of this invention is similar to the first or second embodiment thereof except for design changes described hereafter.

According to the third embodiment of this invention, the control apparatus 50 is omitted, and one of the video recording apparatus 41-43 is replaced by a video recording apparatus 80 containing a control apparatus corresponding to the control apparatus 50.

FIG. 10 shows the blocks of the functions of the video recording apparatus 80 rather than the hardware structure thereof. With reference to FIG. 10, the blocks of the functions of the video recording apparatus 80 include a system controller 800, a camera information manager 801, an operation manager 802, a recording capacity manager 803, a video recording apparatus decider 804, a video recording apparatus and monitor camera commander 805, a monitor camera information storage 806, a video recording apparatus information storage 807, a video receiver 808, a video recorder 809, and a video display 810.

The system controller 800, the camera information manager 801, the video recording apparatus decider 804, the video recording apparatus and monitor camera commander 805, the monitor camera information storage 806, and the video recording apparatus information storage 807 are the same as the system controller 500, the camera information manager 501, the video recording apparatus decider 504, the video recording apparatus and monitor camera commander 505, the monitor camera information storage 506, and the video recording apparatus information storage 507 (see FIG. 3), respectively.

The video receiver 808, the video recorder 809, and the video display 810 are the same as the video receiver 410, the video recorder 411, and the video display 414 (see FIG. 8), respectively.

The operation manager 802 is equivalent to a combination of the operation manager 502 (see FIG. 3) and the operation manager 413 (see FIG. 8).

The recording capacity manager 803 is equivalent to a combination of the recording capacity manager 503 (see FIG. 3) and the recording capacity manager 412 (see FIG. 8).

The video recording apparatus 80 is similar in operation to the control apparatus 50 and the corresponding one of the video recording apparatuses 41-43. The system controller 800 in the video recording apparatus 80 implements control equivalent to the control performed by the control apparatus 50 and the corresponding one of the video recording apparatuses 41-43. The others of the video recording apparatuses 41-43 regard the video recording apparatus 80 as a combination of the control apparatus 50 and a video recording apparatus. The others of the video recording apparatuses 41-43 are similar in operation to those in FIG. 1.

The video recording apparatus 80 includes, for example, a network video recorder, a general-purpose computer, or a personal computer which can serve as a combination of the control apparatus 50 and a video recording apparatus.

As understood from the above description, the video recording apparatus 80 corresponds to a combination of the control apparatus 50 and the video recording apparatus same as one of the video recording apparatuses 41-43.

Fourth Embodiment

A fourth embodiment of this invention is similar to the first embodiment thereof except for design changes described hereafter.

According to the fourth embodiment of this invention, the control apparatus 50 operates as follows. The control apparatus 50 always monitors the video recording apparatuses 41-43. Specifically, the control apparatus 50 always checks whether or not the video recoding apparatuses 41-43 are operating normally, that is, whether or not the video recording apparatuses 41-43 are able to record the video signals. In more detail, for each of the video recording apparatuses 41-43, the operation manager 502 in the control apparatus 50 always refers to the operating condition item (3) of the video recording apparatus information which is normally updated on the basis of the operating condition notice information. The operation manager 502 always decides whether or not each of the video recording apparatuses 41-43 is able to record the video signals on the basis of the operating condition item (3) of the video recording apparatus information.

In the event that the operating condition item (3) of the video recording apparatus information about the video recording apparatus 41 remains not updated and hence takes a value smaller than others for the video recording apparatuses 42 and 43 as shown in FIG. 11, the operation manager 502 decides that the video recording apparatus 41 is wrong and is not operating normally. In this case, the operation manager 502 notifies the system controller 500 in the control apparatus 50 that the video recording apparatus 41 has failed.

Then, the system controller 500 inquires of the video recording apparatus decider 504 in the control apparatus 50 as to the video recording condition of the video recording apparatus 41, specifically, the details of the video recording operation of the video recording apparatus 41 which occurs before the failure. In response to the inquiry, the video recording apparatus decider 504 refers to the monitor camera information in the monitor camera information storage 506 within the control apparatus 50. For example, the video recording apparatus decider 504 detects from the monitor camera information that the video recording apparatus 41 has received 30 JPEG frames from each of the monitor cameras 10-17 per second, and has recorded 240 JPEG frames in total per second before the failure. Furthermore, the video recording apparatus decider 504 detects that the video recording apparatus 42 is receiving 20 JPEG frames from each of the monitor cameras 20-24 per second, and is recording 100 JPEG frames in total per second. The video recording apparatus decider 504 also detects that the video recording apparatus 43 is receiving 3 JPEG frames from each of the monitor cameras 31 and 32 per second, and is recording 6 JPEG frames in total per second.

In addition, the video recording apparatus decider 504 refers to the video recording apparatus information in the video recording apparatus information storage 507. The video recording apparatus decider 504 detects from the video recording apparatus information that each of the video recording apparatuses 41-43 has the capability of recording up to 240 JPEG frames per second. On the basis of the results of the detections, the video recording apparatus decider 504 judges that the video recording apparatus 42 can further record 140 JPEG frames per second and the video recording apparatus 43 can further record 234 JPEG frames per second, and that none of the video recording apparatuses 42 and 43 can fully take over the recording of 240 JPEG frames per second by the video recording apparatus 41. Then, the video recording apparatus decider 504 concludes that the recording by the video recording apparatus 41 should be divided between the video recording apparatus 42 and the video recording apparatus 43. Preferably, the division is designed so as to substantially or roughly equalize the total number of JPEG frames recorded per second by the video recording apparatus 42 and that by the video recording apparatus 43. For example, the video recording apparatus decider 504 concludes that two of the monitor cameras 10-17 and 60 among 240 JPEG frames per second should be newly assigned to the video recording apparatus 42 while six of the monitor cameras 10-17 and 180 among 240 JPEG frames per second should be newly assigned to the video recording apparatus 43. In this case, the video recording apparatus 42 will record 160 JPEG frames in total per second while the video recording apparatus 43 will record 186 JPEG frames in total per second.

The division of the recording by the video recording apparatus 41 between the video recording apparatuses 42 and 43 may be weighted in response to the usable recording capacities in the video recording apparatuses 42 and 43. For example, the weighting is designed so that the usable recording capacities in the video recording apparatuses 42 and 43 will become zero at substantially the same time. In this case, the video recording apparatus decider 504 concludes that one of the monitor cameras 10-17 and 30 among 240 JPEG frames per second should be newly assigned to the video recording apparatus 42 while seven of the monitor cameras 10-17 and 210 among 240 JPEG frames per second should be newly assigned to the video recording apparatus 43. Accordingly, the video recording apparatus 42 will record 130 JPEG frames in total per second while the video recording apparatus 43 will record 216 JPEG frames in total per second.

As a response to the inquiry, the video recording apparatus decider 504 notifies the system controller 500 of the judgment and conclusion contents which represent that, for example, the video signals from one of the monitor cameras 10-17 should be recorded by the normal video recording apparatus 42 instead of the failed video recording apparatus 41 while the video signals from the others of the monitor cameras 10-17 should be recorded by the normal video recording apparatus 43 instead of the failed video recording apparatus 41. On the basis of the contents of the judgment and conclusion by the video recording apparatus decider 504, the system controller 500 determines a new video recording schedule designed to force the normal video recording apparatus 42 to record the video signal from the monitor camera 10, and to force the normal video recording apparatus 43 to record the video signals from the monitor cameras 11-17. The system controller 500 notifies the video recording apparatus and monitor camera commander 505 of the new video recording schedule.

According to the new video recording schedule, the video recording apparatus and monitor camera commander 505 commands the monitor camera 10 to send the video signal to the video recording apparatus 42. In addition, the video recording apparatus and monitor camera commander 505 commands the video recording apparatus 42 to receive the video signal from the monitor camera 10 and record the video signal from the monitor camera 10 at a rate of 30 frames per second, and indicate the images represented by the video signal from the monitor camera 10. The indication of the images is implemented by the video display 414 in the video recording apparatus 42. At the same time, the video recording apparatus and monitor camera commander 505 commands the monitor cameras 11-17 to send the video signals to the video recording apparatus 43. In addition, the video recording apparatus and monitor camera commander 505 commands the video recording apparatus 43 to receive the video signals from the monitor cameras 11-17 and record each of the video signals from the monitor camera 11-17 at a rate of 30 frames per second, and indicate the images represented by the video signals from the monitor cameras 12, 13, 15, and 16 (see FIG. 4). The indication of the images is implemented by the video display 414 in the video recording apparatus 43.

At this time, the monitor camera 10 changes the destination from the failed video recording apparatus 41 to the normal video recording apparatus 42 in response to the command from the control apparatus 50 (the video recording apparatus and monitor camera commander 505). Each of the monitor cameras 11-17 changes the destination from the failed video recording apparatus 41 to the normal video recording apparatus 43 in response to the command from the control apparatus 50.

The video recording apparatus 42 responds to the command from the control apparatus 50 (the video recording apparatus and monitor camera commander 505), thereby receiving the video signal from the monitor camera 10 and starting the recording of the video signal from the monitor camera 10 on the recording medium and the indication of the images represented by the video signal from the monitor camera 10. The indication of the images is implemented by the video display 414 in the video recording apparatus 42. The video recording apparatus 43 responds to the command from the control apparatus 50 (the video recording apparatus and monitor camera commander 505), thereby receiving the video signals from the monitor cameras 11-17 and starting the recording of the video signals from the monitor cameras 11-17 on the recording medium and the indication of the images represented by the video signals from the monitor cameras 12, 13, 15, and 16. The indication of the images is implemented by the video display 414 in the video recording apparatus 43.

The system controller 500 updates the monitor camera information in the monitor camera information storage 506 and the video recording apparatus information in the video recording apparatus information storage 507 in accordance with the new video recording schedule. Then, the control apparatus 50 returns to the state of monitoring the video recording apparatuses 41-43.

As understood from the above description, the control apparatus 50 manages the video recording schedule for the monitor cameras 10-32 and the video recording apparatuses 41-43. The control apparatus 50 always checks whether or not at least one of the video recording apparatuses 41-43 falls into a state of failing to record the video signals. When one of the video recording apparatuses 41-43 fails, the control apparatus 50 divides the recording by the wrong video recording apparatus between the normal video recording apparatuses in the light of the video recording conditions of all the video recording apparatuses 41-43. Then, the control apparatus 50 forces the normal video recording apparatuses to take over the recording by the wrong video recording apparatus. To implement the take-over, the control apparatus 50 issues related commands (inclusive of destination changing commands) to the monitor cameras 10-32 and the video recording apparatuses 41-43. Therefore, even in the event that one of the video recording apparatuses 41-43 fails, the recording of the video signals from all the monitor cameras 10-32 except the monitor camera 30 can be maintained.

It should be noted that the above-mentioned design in the fourth embodiment of this invention may be applied to the second or third embodiment of this invention rather than the first embodiment thereof.

Fifth Embodiment

A fifth embodiment of this invention is similar to the first embodiment thereof except for design changes described hereafter.

According to the fifth embodiment of this invention, the control apparatus 50 operates as follows. The control apparatus 50 always monitors the video recording apparatuses 41-43. Specifically, the control apparatus 50 always checks whether or not the video recoding apparatuses 41-43 are operating normally, that is, whether or not the video recording apparatuses 41-43 are able to record the video signals. In more detail, for each of the video recording apparatuses 41-43, the operation manager 502 in the control apparatus 50 always refers to the operating condition item (3) of the video recording apparatus information which is normally updated on the basis of the operating condition notice information. The operation manager 502 always decides whether or not each of the video recording apparatuses 41-43 is able to record the video signals on the basis of the operating condition item (3) of the video recording apparatus information.

In the event that the operating condition items (3) of the video recording apparatus information about the video recording apparatuses 42 and 43 remain not updated and hence take values smaller than the value for the video recording apparatus 41 as shown in FIG. 12, the operation manager 502 decides that the video recording apparatuses 42 and 43 are wrong and are not operating normally. In this case, the operation manager 502 notifies the system controller 500 in the control apparatus 50 that the video recording apparatuses 42 and 43 have failed.

Then, the system controller 500 inquires of the video recording apparatus decider 504 in the control apparatus 50 as to the video recording conditions of the video recording apparatuses 42 and 43, specifically, the details of the video recording operation of the video recording apparatuses 42 and 43 which occurs before the failure. In response to the inquiry, the video recording apparatus decider 504 refers to the monitor camera information in the monitor camera information storage 506 within the control apparatus 50. For example, the video recording apparatus decider 504 detects from the monitor camera information that the video recording apparatus 42 has received 20 JPEG frames from each of the monitor cameras 20-24 per second, and has recorded 100 JPEG frames in total per second before the failure. Furthermore, the video recording apparatus decider 504 detects that the video recording apparatus 43 has received 3 JPEG frames from each of the monitor cameras 31 and 32 per second, and has recorded 6 JPEG frames in total per second before the failure. In addition, the video recording apparatus decider 504 detects that the video recording apparatus 41 is receiving 30 JPEG frames from each of the monitor cameras 10-17 per second, and is recording 240 JPEG frames in total per second.

The video recording apparatus decider 504 also refers to the video recording apparatus information in the video recording apparatus information storage 507. The video recording apparatus decider 504 detects from the video recording apparatus information that each of the video recording apparatuses 41-43 has the capability of recording up to 240 JPEG frames per second. On the basis of the results of the detections, the video recording apparatus decider 504 judges that the recording capability of the video recording apparatus 41 is fully used and hence the video recording apparatus 41 can not take over the recording of 106 JPEG frames per second by the video recording apparatuses 42 and 43.

Accordingly, the video recording apparatus decider 504 concludes that the transmission frame rates about the video signals from the monitor cameras 10-32 except the monitor camera 30 should be changed so as to enable the normal video recording apparatus 41 to record all the video signals from the monitor cameras 10-32 except the monitor camera 30. Specifically, the video recording apparatus decider 504 concludes that the transmission frame rate about each of the video signals from the monitor cameras 10-32 except the monitor camera 30 should be changed to 16 JPEG frames per second. In this case, the video recording apparatus 41 is required to record 240 JPEG frames in total per second.

It should be noted that the change of the transmission frame rates about the video signals may be performed in such a manner as to substantially maintain the ratio among the original transmission frame rates (30 JPEG frames per second for each of the video signals from the monitor cameras 10-17: 20 JPEG frames per second for each of the video signals from the monitor cameras 20-24: 3 JPEG frames per second for each of the video signals from the monitor cameras 31 and 32).

Then, the video recording apparatus decider 504 concludes that the monitor cameras 10-17 and related 128 JPEG frames per second should be assigned to the normal video recording apparatus 41, and the monitor cameras 20-24 and related 80 JPEG frames per second should be newly assigned to the normal video recording apparatus 41 and also the monitor cameras 31 and 32 and related 32 JPEG frames per second should be newly assigned thereto. In this case, the video recording apparatus 41 will record 240 JPEG frames in total per second.

As a response to the inquiry, the video recording apparatus decider 504 notifies the system controller 500 of the judgment and conclusion contents which represent that the transmission frame rate about each of the video signals from the monitor cameras 10-32 except the monitor camera 30 should be changed to 16 JPEG frames per second while the video signals from the monitor cameras 10-32 except the monitor camera 30 should be recorded by the video recording apparatus 41. On the basis of the contents of the judgment and conclusion by the video recording apparatus decider 504, the system controller 500 determines a new video recording schedule designed to set the transmission frame rate about each of the video signals from the monitor cameras 10-32 except the monitor camera 30 to 16 JPEG frames per second, and to force the normal video recording apparatus 41 to record the video signals from the monitor cameras 10-32 except the monitor camera 30. The system controller 500 notifies the video recording apparatus and monitor camera commander 505 of the new video recording schedule.

According to the new video recording schedule, the video recording apparatus and monitor camera commander 505 commands the monitor cameras 10-32 to send the video signals to the video recording apparatus 41. In addition, the video recording apparatus and monitor camera commander 505 commands the monitor cameras 10-32 except the monitor camera 30 to change the transmission frame rates about the video signals to 16 JPEG frames per second. Furthermore, the video recording apparatus and monitor camera commander 505 commands the video recording apparatus 41 to receive the video signals from the monitor cameras 10-32 and record each of the video signals from the monitor cameras 10-32 except the monitor camera 30 at a rate of 16 frames per second, and indicate the images represented by the video signals from the monitor cameras 10, 12, 13, 15, 16, 20, 21, and 30 (see FIG. 4). The indication of the images is implemented by the video display 414 in the video recording apparatus 41.

At this time, each of the monitor cameras 20-24 changes the destination from the failed video recording apparatus 42 to the normal video recording apparatus 41 in response to the command from the control apparatus 50 (the video recording apparatus and monitor camera commander 505). Each of the monitor cameras 30-32 changes the destination from the failed video recording apparatus 43 to the normal video recording apparatus 41 in response to the command from the control apparatus 50.

The video recording apparatus 41 responds to the command from the control apparatus 50 (the video recording apparatus and monitor camera commander 505), thereby newly receiving the video signals from the monitor cameras 20-24 and starting the recording of the video signals from the monitor cameras 20-24 on the recording medium and the indication of the images represented by the video signals from the monitor cameras 20 and 21. The indication of the images is implemented by the video display 414 in the video recording apparatus 41. In addition, the video recording apparatus 41 responds to the command from the control apparatus 50, thereby newly receiving the video signals from the monitor cameras 30-32 and starting the recording of the video signals from the monitor cameras 31 and 32 on the recording medium and the indication of the images represented by the video signal from the monitor camera 30. The indication of the images is implemented by the video display 414 in the video recording apparatus 41.

The system controller 500 updates the monitor camera information in the monitor camera information storage 506 and the video recording apparatus information in the video recording apparatus information storage 507 in accordance with the new video recording schedule. As shown in FIG. 13, the updated monitor camera information represents that the transmission frame rates and the recoding frame rates about the video signals from the monitor cameras 10-32 except the monitor camera 30 are 16 JPEG frames per second, and that all the destinations to which the video signals are directed from the monitor cameras 10-32 correspond to the video recording apparatus 41. After the updating of the monitor camera information and the video recording apparatus information, the control apparatus 50 returns to the state of monitoring the video recording apparatuses 41-43.

In the case where the recording capability of each of the video recording apparatuses 41-43 is expressed by the maximum file capacity, it is preferable to change image-quality-related parameters about the video signals from the monitor cameras 10-32 instead of the transmission frame rates and the recording frame rates.

As understood from the above description, the control apparatus 50 manages the video recording schedule for the monitor cameras 10-32 and the video recording apparatuses 41-43. The control apparatus 50 always checks whether or not at least one of the video recording apparatuses 41-43 falls into a state of failing to record video signals. When one or two of the video recording apparatuses 41-43 fail, the control apparatus 50 changes the transmission frame rates about the video signals from the monitor cameras 10-32 except the monitor camera 30 in the light of the video recording conditions of all the video recording apparatuses 41-43. Then, the control apparatus 50 forces the normal video recording apparatus (or apparatuses) to take over the recording by the wrong video recording apparatus (or apparatuses). To implement the takeover, the control apparatus 50 issues related commands (inclusive of destination changing commands) to the monitor cameras 10-32 and the video recording apparatuses 41-43. Therefore, even in the event that one or two of the video recording apparatuses 41-43 fail, the recording of the video signals from all the monitor cameras 10-32 except the monitor camera 30 can be maintained.

It should be noted that the above-mentioned design in the fifth embodiment of this invention may be applied to the second or third embodiment of this invention rather than the first embodiment thereof. The fifth embodiment of this invention and the fourth embodiment thereof may be combined so as to simultaneously change the assignment of the monitor cameras 10-32 to the video recording apparatuses 41-43, the transmission frame rates about the video signals from the monitor cameras 10-32 except the monitor camera 30, and the frame rates of the recording of the video signals from the monitor cameras 10-32 except the monitor camera 30 upon the occurrence of a failure of at least one of the video recording apparatuses 41-43.

Sixth Embodiment

Figure 14:
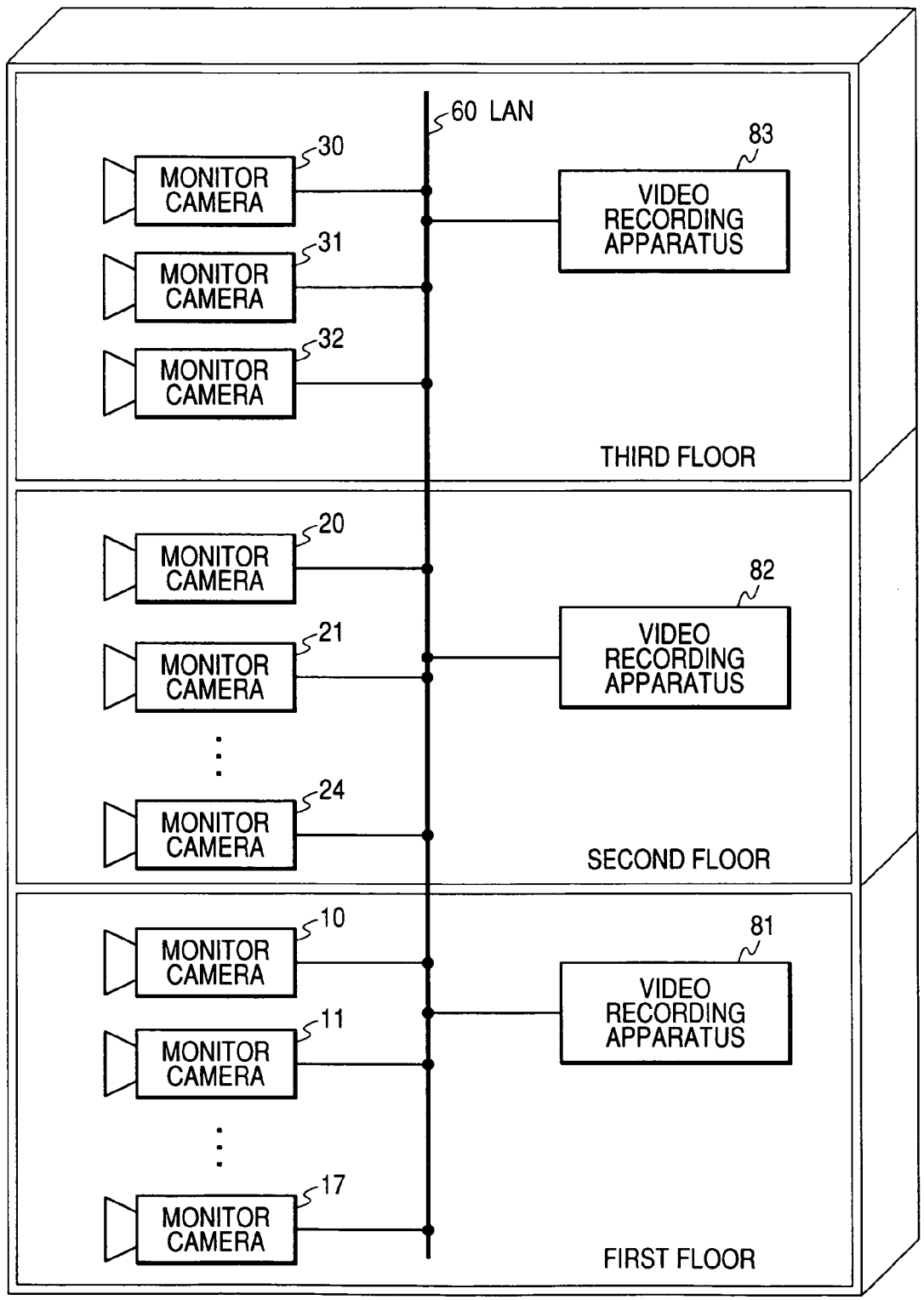
FIG. 14 is a diagram of a video recording control system according to a sixth embodiment of this invention.

FIG. 14 shows a video recording control system according to a sixth embodiment of this invention. The system of FIG. 14 is similar to the system of FIG. 1 except for design changes described hereafter.

The system of FIG. 14 includes video recording apparatuses 81, 82, and 83 instead of the video recording apparatuses 41, 42, and 43 (see FIG. 1). The system of FIG. 14 includes monitor cameras 10-32 which are similar to those in the second embodiment of this invention. Thus, each of the monitor cameras 10-32 can receive a video request from the video recording apparatus 81, 82, or 83 via the LAN 60, and send the video signal to a destination identical with the video recording apparatus which makes the video request.

The video recording apparatuses 81-83 are similar to the video recording apparatus 80 in the third embodiment of this invention (see FIG. 10). Each of the video recording apparatuses 81-83 can send a video request to one or ones of the monitor cameras 10-32, and receive the video signal or signals therefrom. Each of the video recording apparatuses 81-83 can record and visualize the received video signal or signals. Each of the video recording apparatuses 81-83 contains a control apparatus corresponding to the control apparatus 50 (see FIGS. 1-3).

The video recording apparatus and monitor camera commander 805 (see FIG. 10) in each of the video recording apparatuses 81-83 can send command information about the related video recording apparatus to prescribed one or ones of the monitor cameras 10-32 and also the system controller 800 (see FIG. 10) in the related video recording apparatus.

Each of the video recording apparatuses 81-83 manages a video signal or signals to be recorded by itself, and performs a preliminary process for decisions concerning a video signal or signals which can be received by itself.

The video recording apparatuses 81-83 store the same monitor camera information and the same video recording apparatus information. For example, at an initial stage of operation of the system in FIG. 14, the monitor camera information and the video recording apparatus information are exchanged among the video recording apparatuses 81-83 so that the video recording apparatuses 81-83 will store the same monitor camera information and the same video recording apparatus information. Alternatively, the same monitor camera information and the same video recording apparatus information may be preset in the video recording apparatuses 81-83. Thereafter, operating condition notice information is periodically transmitted among the video recording apparatuses 81-83 to equally update the usable recording capacity item (2) and the operating condition item (3) in the video recording apparatus information in each of the video recording apparatuses 81-83. It should be noted that each of the video recording apparatuses 81-83 can update the video recording apparatus information stored therein in accordance with the usable recording capacity and the operating condition thereof. Consequently, the monitor camera information stored in the video recording apparatuses 81-83 is the same. The video recording apparatus information stored in the video recording apparatuses 81-83 is also the same.

As previously mentioned, each of the video recording apparatuses 81-83 contains a control apparatus corresponding to the control apparatus 50. The video recording apparatuses 81-83 store the same monitor camera information and the same video recording apparatus information. Each of the video recording apparatuses 81-83 sends a video request to desired one or ones of the monitor cameras 10-32, and receive the video signal or signals therefrom. Each of the video recording apparatuses 81-83 records and visualizes at least one of the received video signal or signals.

FIG. 15 shows an example of the contents of the monitor camera information stored in the video recording apparatuses 81-83. The structure of the monitor camera information in FIG. 15 is similar to that in FIG. 4. FIG. 16 shows an example of the contents of the video recording apparatus information stored in the video recording apparatuses 81-83. The structure of the video recording apparatus information in FIG. 16 is similar to that in FIG. 5.

Normally, the monitor cameras 10-17 are assigned to the video recording apparatus 81. The monitor cameras 20-24 are assigned to the video recording apparatus 82. The monitor cameras 30-32 are assigned to the video recording apparatus 83.

Normally, the video recording apparatus 81 sends a video request to the monitor cameras 10-17 in accordance with the monitor camera information, and receives the video signals therefrom. The video recording apparatus 81 records the received video signals and visualizes designated ones of the received video signals in accordance with the monitor camera information. The video recording apparatus 82 sends a video request to the monitor cameras 20-24 in accordance with the monitor camera information, and receives the video signals therefrom. The video recording apparatus 82 records the received video signals and visualizes designated ones of the received video signals in accordance with the monitor camera information. The video recording apparatus 83 sends a video request to the monitor cameras 30-32 in accordance with the monitor camera information, and receives the video signals therefrom. The video recording apparatus 83 records designated ones of the received video signals and visualizes designated one or ones of the received video signals in accordance with the monitor camera information.

Each of the video recording apparatuses 81-83 periodically sends the operating condition notice information to the other video recording apparatuses, thereby notifying them of the usable recording capacity therein and also notifying them that the present video recording apparatus is operating normally.

Each of the video recording apparatuses 81-83 updates the video recording apparatus information therein in response to the operating condition notice information sent toward the other video recording apparatuses and also the operating condition notice information received from the other video recording apparatuses. Each of the video recording apparatuses 81-83 monitors the operating conditions of the other video recording apparatuses by referring to the video recording apparatus information. The above-mentioned updating of the video recording apparatus information in each of the video recording apparatuses 81-83 enables the video recording apparatuses 81-83 to store the same video recording apparatus information.

In the event that the video recording apparatus 83 fails to send the operating condition notice information, the operating condition item (3) of the video recording apparatus information about the video recording apparatus 83 remains not updated and hence takes a value smaller than others for the video recording apparatuses 81 and 82 as shown in FIG. 16. In this case, for example, the video recording apparatus 82 detects the failure of the video recording apparatus 83 from the video recording apparatus information before the video recording apparatus 81 does. Specifically, the operation manager 802 (see FIG. 10) in the video recording apparatus 82 decides, on the basis of the video recording apparatus information in the video recording apparatus information storage 807 (see FIG. 10) therein, that the video recording apparatus 83 is wrong and is not operating normally. Then, the operation manager 802 notifies the system controller 800 (see FIG. 10) in the video recording apparatus 82 that the video recording apparatus 83 has failed.

Subsequently, the system controller 800 inquires of the video recording apparatus decider 804 (see FIG. 10) in the video recording apparatus 82 as to the video recording condition of the video recording apparatus 83, specifically, the details of the video recording operation of the video recording apparatus 83 which occurs before the failure. In response to the inquiry, the video recording apparatus decider 804 refers to the monitor camera information in the monitor camera information storage 806 (see FIG. 10) within the video recording apparatus 82. For example, the video recording apparatus decider 804 detects from the monitor camera information that the video recording apparatus 83 has received 3 JPEG frames from each of the monitor cameras 31 and 32 per second, and has recorded 6 JPEG frames in total per second before the failure. Furthermore, the video recording apparatus decider 804 detects that the video recording apparatus 82 is receiving 20 JPEG frames from each of the monitor cameras 20-24 per second, and is recording 100 JPEG frames in total per second.

In addition, the video recording apparatus decider 804 refers to the video recording apparatus information in the video recording apparatus information storage 807. The video recording apparatus decider 804 detects from the video recording apparatus information that each of the video recording apparatuses 81-83 has the capability of recording up to 240 JPEG frames per second. On the basis of the results of the detections, the video recording apparatus decider 804 judges that the video recording apparatus 82 can further record 140 JPEG frames per second and take over the recording of 6 JPEG frames per second by the video recording apparatus 83.

As a response to the inquiry, the video recording apparatus decider 804 notifies the system controller 800 of the judgment contents which represent that the video signals from the monitor cameras 31 and 32 can be recorded by the normal video recording apparatus 82 instead of the failed video recording apparatus 83. On the basis of the contents of the judgment by the video recording apparatus decider 804, the system controller 800 determines a new video recording schedule designed to force the normal video recording apparatus 82 to record the video signals from the monitor cameras 31 and 32. The system controller 800 notifies the new video recording schedule to the video recording apparatus and monitor camera commander 805 (see FIG. 10) in the video recording apparatus 82.

According to the new video recording schedule, the video recording apparatus and monitor camera commander 805 commands the monitor cameras 30-32 to send the video signals to the normal video recording apparatus 82 instead of the failed video recording apparatus 83. In addition, the video recording apparatus and monitor camera commander 805 commands the video receiver 808 (see FIG. 10) in the normal video recording apparatus 82 to receive the video signals from the monitor cameras 30-32, and commands the video recorder 809 (see FIG. 10) in the normal video recording apparatus 82 to record the video signals from the monitor cameras 31 and 32 at a rate of 3 frames per second. Furthermore, the video recording apparatus and monitor camera commander 805 commands the video display 810 (see FIG. 10) in the normal video recording apparatus 82 to indicate the images represented by the video signal from the monitor camera 30.

The system controller 800 updates the monitor camera information in the monitor camera information storage 806 and the video recording apparatus information in the video recording apparatus information storage 807 in accordance with the new video recording schedule. The video recording apparatus 82 sends the updated monitor camera information and the updated video recording apparatus information (or the updated difference information) to the video recording apparatus 81 as, for example, the operating condition notice information. Then, the video recording apparatus 82 returns to the state of monitoring the video recording apparatuses 81 and 83.

The video recording apparatus 81 receives the updated monitor camera information and the updated video recording apparatus information from the video recording apparatus 82. In the video recording apparatus 81, the system controller 800 updates the monitor camera information in the monitor camera information storage 806 and the video recording apparatus information in the video recording apparatus information storage 807 in accordance with the received monitor camera information and the received video recording apparatus information. As a result, the monitor camera information in the video recording apparatus 81 and that in the video recording apparatus 82 are equalized. The video recording apparatus information in the video recording apparatus 81 and that in the video recording apparatus 82 are equalized.

As understood from the above description, the video recording apparatuses 81-83 mutually monitor the operating conditions thereof. In the event that one of the video recording apparatuses 81-83 falls into a state of failing to record the video signals, at least one of the normal recording apparatuses decides whether or not the recording by the wrong video recording apparatus can be taken over by itself. When it is decided that the recording by the wrong video recording apparatus can be taken over, the normal video recording apparatus implements the take-over. To implement the take-over, the normal video recording apparatus issues destination change commands to the desired ones of the monitor cameras 10-32. Therefore, even in the event that one of the video recording apparatuses 81-83 fails, the recording of the video signals from all the monitor cameras 10-32 except the monitor camera 30 can be maintained.

Seventh Embodiment

A seventh embodiment of this invention is similar to the sixth embodiment thereof except for design changes described hereafter. The seventh embodiment of this invention includes a receiving condition management apparatus 1000 connected with the LAN 60.

Figures 17, 18:
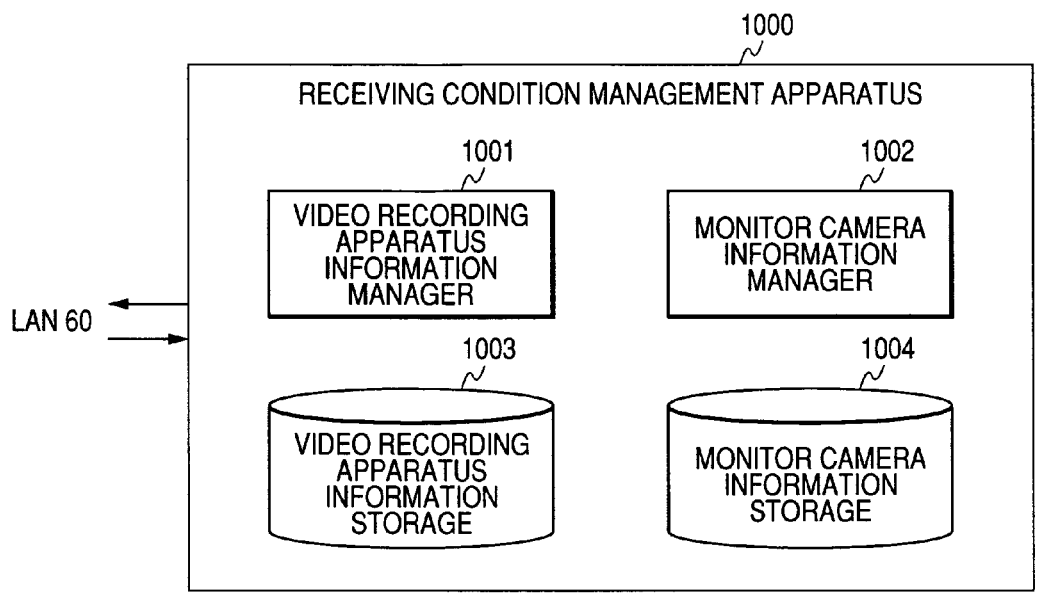
FIG. 17 is a diagram of the functions of a receiving condition management apparatus in a video recording control system according to a seventh embodiment of this invention.
FIG. 18 is a diagram showing an example of the contents of video recording apparatus information in a video recording control system according to an eighth embodiment of this invention.

FIG. 17 shows the blocks of the functions of the receiving condition management apparatus 1000 rather than the hardware structure thereof. With reference to FIG. 17, the blocks of the functions of the receiving condition management apparatus 1000 include a video recording apparatus information manager 1001, a monitor camera information manager 1002, a video recording apparatus information storage 1003, and a monitor camera information storage 1004.

The video recording apparatus information manager 1001 performs management of the video recording apparatus information concerning the video recording apparatuses 81-83. The monitor camera information manager 1002 performs management of the monitor camera information. The video recording apparatus information storage 1003 stores the video recording apparatus information. The monitor camera information storage 1004 stores the monitor camera information.

The monitor camera information storage 806 (see FIG. 10) and the video recording apparatus information storage 807 (see FIG. 10) are omitted from each of the video recording apparatuses 81-83. All the video recording apparatuses 81-83 utilize the monitor camera information and the video recording apparatus information in the receiving condition management apparatus 1000. Each of the video recording apparatuses 81-83 can read and write the monitor camera information and the video recording apparatus information from and into the receiving condition management apparatus 1000, and can update the monitor camera information and the video recording apparatus information in the receiving condition management apparatus 1000.

The receiving condition management apparatus 1000 includes, for example, a computer equipped with a communication interface connected with the LAN 60.

Eighth Embodiment

An eighth embodiment of this invention is similar to the sixth embodiment thereof except for design changes described hereafter.

In the event that the video recording apparatus 81 fails to send the operating condition notice information, the operating condition item (3) of the video recording apparatus information about the video recording apparatus 81 remains not updated and hence takes a value smaller than others for the video recording apparatuses 82 and 83 as shown in FIG. 18. In this case, for example, the video recording apparatus 82 detects the failure of the video recording apparatus 81 from the video recording apparatus information before the video recording apparatus 83 does. Specifically, the operation manager 802 in the video recording apparatus 82 decides, on the basis of the video recording apparatus information in the video recording apparatus information storage 807 therein, that the video recording apparatus 81 is wrong and is not operating normally. Then, the operation manager 802 notifies the system controller 800 in the video recording apparatus 82 that the video recording apparatus 81 has failed.

Subsequently, the system controller 800 inquires of the video recording apparatus decider 804 in the video recording apparatus 82 as to the video recording condition of the video recording apparatus 81, specifically, the details of the video recording operation of the video recording apparatus 81 which occurs before the failure. In response to the inquiry, the video recording apparatus decider 804 refers to the monitor camera information in the monitor camera information storage 806 within the video recording apparatus 82. For example, the video recording apparatus decider 804 detects from the monitor camera information that the video recording apparatus 81 has received 30 JPEG frames from each of the monitor cameras 10-17 per second, and has recorded 240 JPEG frames in total per second before the failure. Furthermore, the video recording apparatus decider 804 detects that the video recording apparatus 82 is receiving 20 JPEG frames from each of the monitor cameras 20-24 per second, and is recording 100 JPEG frames in total per second.

In addition, the video recording apparatus decider 804 refers to the video recording apparatus information in the video recording apparatus information storage 807 within the video recording apparatus 82. The video recording apparatus decider 804 detects from the video recording apparatus information that the video recording apparatus 82 has the capability of recording up to 240 JPEG frames per second. On the basis of the results of the detections, the video recording apparatus decider 804 judges that the video recording apparatus 82 can further record 140 JPEG frames per second, and that the video recording apparatus 82 can take over the 120-frame portion of the recording of 240 JPEG frames per second by the video recording apparatus 81.

As a response to the inquiry, the video recording apparatus decider 804 notifies the system controller 800 of the judgment contents which represent that, for example, the video signals from the monitor cameras 10-13 can be recorded by the normal video recording apparatus 82 instead of the failed video recording apparatus 81. On the basis of the contents of the judgment by the video recording apparatus decider 804, the system controller 800 determines a new video recording schedule designed to force the normal video recording apparatus 82 to record the video signals from the monitor cameras 10-13 in addition to those from the monitor cameras 20-24. In the video recording apparatus 82, the system controller 800 notifies the video recording apparatus and monitor camera commander 805 of the new video recording schedule.

According to the new video recording schedule, the video recording apparatus and monitor camera commander 805 commands the monitor cameras 10-13 to send the video signals to the video recording apparatus 82. In addition, the video recording apparatus and monitor camera commander 805 commands the video receiver 808 in the video recording apparatus 82 to receive the video signals from the monitor cameras 10-13. Furthermore, the video recording apparatus and monitor camera commander 805 commands the video recorder 809 in the video recording apparatus 82 to record each of the video signals from the monitor cameras 10-13 at a rate of 30 frames per second. At the same time, the video recording apparatus and monitor camera commander 805 commands the video display 810 in the video recording apparatus 82 to indicate the images represented by the video signals from the monitor cameras 10, 12, and 13.

The system controller 800 updates the monitor camera information in the monitor camera information storage 806 and the video recording apparatus information in the video recording apparatus information storage 807 in accordance with the new video recording schedule. The video recording apparatus 82 sends the updated monitor camera information and the updated video recording apparatus information (or the updated difference information) to the video recording apparatus 83 as, for example, the operating condition notice information. Then, the video recording apparatus 82 returns to the state of monitoring the video recording apparatuses 81 and 83. As shown in FIG. 19, the monitor camera information which has been updated by the video recording apparatus 82 represents that the monitor cameras 10-13 are assigned to the normal video recording apparatus 82 instead of the failed video recording apparatus 81 while the monitor cameras 14-17 are still assigned to the failed video recording apparatus 81.

Thereafter, the video recording apparatus 83 detects the failure of the video recording apparatus 81 as the video recording apparatus 82 does. The video recording apparatus 83 decides, on the basis of the updated monitor camera information and the updated video recording apparatus information, whether or not the remaining portion of the recording by the video recording apparatus 81 (the recording of the video signals from the monitor cameras 14-17) can be taken over by itself. For example, the video recording apparatus 83 judges that the recording of the video signals from the monitor cameras 14-17 can be taken over by itself. On the basis of the contents of the judgment, the video recording apparatus 83 determines a new video recording schedule designed to record the video signals from the monitor cameras 14-17 in addition to those from the monitor cameras 31 and 32 by itself.

According to the new video recording schedule, the video recording apparatus 83 commands the monitor cameras 14-17 to send the video signals thereto. Then, the video recording apparatus 83 receives the video signals from the monitor cameras 14-17. The video recording apparatus 83 records the video signals from the monitor cameras 14-17. In addition, the video recording apparatus 83 visualizes the video signals from the monitor cameras 15 and 16. The video recording apparatus 83 updates the monitor camera information and the video recording apparatus information therein in accordance with the new video recording schedule. The updated monitor camera information represents that the monitor cameras 14-17 are assigned to the normal video recording apparatus 83 instead of the failed video recording apparatus 81. The video recording apparatus 83 sends the updated monitor camera information and the updated video recording apparatus information (or the updated difference information) to the video recording apparatus 82 as, for example, the operating condition notice information. Then, the video recording apparatus 83 returns to the state of monitoring the video recording apparatuses 81 and 82.

As a result, the video signals from the monitor cameras 10-13 are recorded by the normal video recording apparatus 82 instead of the failed video recording apparatus 81. The video signals from the monitor cameras 14-17 are recorded by the normal video recording apparatus 83 instead of the failed video recording apparatus 81.

As understood from the above description, the video recording apparatuses 81-83 mutually monitor the operating conditions thereof. In the event that one of the video recording apparatuses 81-83 falls into a state of failing to record the video signals, each of the normal recording apparatuses decides whether or not the recording by the wrong video recording apparatus can be at least partially taken over by itself. When it is decided that the recording by the wrong video recording apparatus can be at least partially taken over, each of the normal video recording apparatuses implements the take-over. To implement the take-over, each of the normal video recording apparatuses issues destination change commands to the desired ones of the monitor cameras 10-32. Therefore, even in the event that one of the video recording apparatuses 81-83 fails, the recording by the wrong video recording apparatus is taken over by the normal video recording apparatuses so that the recording of the video signals from all the monitor cameras 10-32 except the monitor camera 30 can be maintained.

Ninth Embodiment

A ninth embodiment of this invention is similar to the sixth embodiment thereof except for design changes described hereafter.

In the event that the video recording apparatuses 82 and 83 fail to send the operating condition notice information, the operating condition items (3) of the video recording apparatus information about the video recording apparatuses 82 and 83 remain not updated and hence take values smaller than that for the video recording apparatus 81 as shown in FIG. 20. In this case, the video recording apparatus 81 detects the failure of each of the video recording apparatuses 82 and 83 from the video recording apparatus information. Specifically, the operation manager 802 in the video recording apparatus 81 decides, on the basis of the video recording apparatus information in the video recording apparatus information storage 807 therein, that the video recording apparatuses 82 and 83 are wrong and are not operating normally. Then, the operation manager 802 notifies the system controller 800 in the video recording apparatus 81 that the video recording apparatuses 82 and 83 have failed.

Subsequently, the system controller 800 inquires of the video recording apparatus decider 804 in the video recording apparatus 81 as to the video recording conditions of the video recording apparatuses 82 and 83, specifically, the details of the video recording operation of each of the video recording apparatuses 82 and 83 which occurs before the failure. In response to the inquiry, the video recording apparatus decider 804 refers to the monitor camera information in the monitor camera information storage 806 within the video recording apparatus 81. For example, the video recording apparatus decider 804 detects from the monitor camera information that the video recording apparatus 82 has received 20 JPEG frames from each of the monitor cameras 20-24 per second, and has recorded 100 JPEG frames in total per second before the failure. Furthermore, the video recording apparatus decider 804 detects that the video recording apparatus 83 has received 3 JPEG frames from each of the monitor cameras 31 and 32 per second, and has recorded 6 JPEG frames in total per second before the failure. In addition, the video recording apparatus decider 804 detects that the video recording apparatus 81 is receiving 30 JPEG frames from each of the monitor cameras 10-17 per second, and is recording 240 JPEG frames in total per second.

The video recording apparatus decider 804 also refers to the video recording apparatus information in the video recording apparatus information storage 807 within the video recording apparatus 81. The video recording apparatus decider 804 detects from the video recording apparatus information that each of the video recording apparatuses 81-83 has the capability of recording up to 240 JPEG frames per second. On the basis of the results of the detections, the video recording apparatus decider 804 judges that the recording capability of the video recording apparatus 81 is fully used and hence the video recording apparatus 81 can not take over the recording of 106 JPEG frames per second by the video recording apparatuses 82 and 83.

Accordingly, the video recording apparatus decider 804 concludes that the transmission frame rates about the video signals from the monitor cameras 10-32 except the monitor camera 30 should be changed so as to enable the video recording apparatus 81 to record all the video signals from the monitor cameras 10-32 except the monitor camera 30. Specifically, the video recording apparatus decider 804 concludes that the transmission frame rate about each of the video signals from the monitor cameras 10-32 except the monitor camera 30 should be changed to 16 JPEG frames per second. In this case, the video recording apparatus 81 is required to record 240 JPEG frames in total per second.

It should be noted that the change of the transmission frame rates about the video signals may be performed in such a manner as to substantially maintain the ratio among the original transmission frame rates (30 JPEG frames per second for each of the video signals from the monitor cameras 10-17: 20 JPEG frames per second for each of the video signals from the monitor cameras 20-24: 3 JPEG frames per second for each of the video signals from the monitor cameras 31 and 32).

Then, the video recording apparatus decider 804 concludes that the monitor cameras 10-17 and related 128 JPEG frames per second should be assigned to the video recording apparatus 81, and the monitor cameras 20-24 and related 80 JPEG frames per second should be newly assigned to the video recording apparatus 81 and also the monitor cameras 31 and 32 and related 32 JPEG frames per second should be newly assigned thereto. In this case, the video recording apparatus 81 will record 240 JPEG frames in total per second.

As a response to the inquiry, the video recording apparatus decider 804 notifies the system controller 800 of the judgment and conclusion contents which represent that the transmission frame rate about each of the video signals from the monitor cameras 10-32 except the monitor camera 30 should be changed to 16 JPEG frames per second while the video signals from the monitor cameras 10-32 except the monitor camera 30 should be recorded by the video recording apparatus 81. On the basis of the contents of the judgment and conclusion by the video recording apparatus decider 804, the system controller 800 determines a new video recording schedule designed to set the transmission frame rate about each of the video signals from the monitor cameras 10-32 except the monitor camera 30 to 16 JPEG frames per second, and to force the video recording apparatus 81 to record the video signals from the monitor cameras 10-32 except the monitor camera 30. In the video recording apparatus 81, the system controller 800 notifies the video recording apparatus and monitor camera commander 805 of the new video recording schedule.

According to the new video recording schedule, the video recording apparatus and monitor camera commander 805 commands the monitor cameras 10-32 to send the video signals to the video recording apparatus 81. In addition, the video recording apparatus and monitor camera commander 805 commands the monitor cameras 10-32 except the monitor camera 30 to change the transmission frame rates about the video signals to 16 JPEG frames per second. Furthermore, the video recording apparatus and monitor camera commander 805 commands the video receiver 808 in the video recording apparatus 81 to receive the video signals from the monitor cameras 10-32, and commands the video recorder 809 in the video recording apparatus 81 to record each of the video signals from the monitor cameras 10-32 except the monitor camera 30 at a rate of 16 frames per second. At the same time, the video recording apparatus and monitor camera commander 805 commands the video display 810 in the video recording apparatus 81 to indicate the images represented by the video signals from the monitor cameras 10, 12, 13, 15, 16, 20, 21, and 30 (see FIG. 19).

As a result, the video recording apparatus 81 newly receives the video signals from the monitor cameras 20-24 and starts the recording of the video signals from the monitor cameras 20-24 on the recording medium and the indication of the images represented by the video signals from the monitor cameras 20 and 21. In addition, the video recording apparatus 81 newly receives the video signals from the monitor cameras 30-32 and starts the recording of the video signals from the monitor cameras 31 and 32 on the recording medium and the indication of the images represented by the video signal from the monitor camera 30.

In the video recording apparatus 81, the system controller 800 updates the monitor camera information in the monitor camera information storage 806 and the video recording apparatus information in the video recording apparatus information storage 807 according to the new video recording schedule. The updated monitor camera information represents that the transmission frame rates and the recoding frame rates about the video signals from the monitor cameras 10-32 except the monitor camera 30 are 16 JPEG frames per second, and that all the destinations to which the video signals are directed from the monitor cameras 10-32 correspond to the video recording apparatus 81. After the updating of the monitor camera information and the video recording apparatus information, the video recoding apparatus 81 returns to the state of monitoring the video recording apparatuses 82 and 83.

As understood from the above description, the video recording apparatuses 81-83 mutually monitor the operating conditions thereof. When one or two of the video recording apparatuses 81-83 fail, the normal video recording apparatus changes the transmission frame rates about the video signals from the monitor cameras 10-32. Then, the normal video recording apparatus takes over the recording by the wrong video recording apparatus (or apparatuses). Therefore, even in the event that one or two of the video recording apparatuses 81-83 fail, the recording of the video signals from all the monitor cameras 10-32 except the monitor camera 30 can be maintained.

Tenth Embodiment

A tenth embodiment of this invention is similar to one of the first to ninth embodiments thereof except that the JPEG format for the video signals outputted from the monitor cameras 10-32 is replaced by an MPEG (Moving Picture Expert Group) format or an H.264 format.

Preferably, the assignment or reassignment of the monitor cameras 10-32 to the video recording apparatuses 41-43 or 81-83 is implemented on the basis of the transmission bit rates about the video signals from the monitor cameras 10-32 rather than the transmission frame rates thereabout. The rates of the transmission of the video information from the monitor cameras 10-32 are decreased by reducing the transmission bit rates rather than reducing the transmission frame rates or the image qualities.

Eleventh Embodiment

A video recording control system in an eleventh embodiment of this invention is similar to that in one of the first to tenth embodiments thereof except for the following point.

In the event that the usable recording capacity in one of the video recording apparatuses 41-43 or 81-83 drops below a predetermined reference level (for example, 10), the system performs operation steps similar to those implemented against the failure of that video recording apparatus.

What is claimed is:

1. A video recording control system comprising a plurality of monitor cameras, a plurality of video recording apparatuses, a control apparatus, and a network connecting the monitor cameras, the video recording apparatuses, and the control apparatus;

wherein each of the monitor cameras comprises:
 (a1) image taking means for taking an image of a scene at a prescribed place and generating a video signal representing the taken image; and
 (a2) video transmitting means for sending the video signal generated by the image taking means to a prescribed video recording apparatus among the video recording apparatuses;

wherein each of the video recording apparatuses comprises:
 (b1) video receiving means for receiving a video signal sent by a prescribed monitor camera among the monitor cameras;
 (b2) video recording means for recording the video signal received by the video receiving means on a recording medium; and
 (b3) operating condition transmitting means for periodically transmitting operating condition notice information to the control apparatus or transmitting operating condition notice information to the control apparatus upon detection of a change in an operating condition, the operating condition notice information including at least one of (1) information representing that the related video recording apparatus is operating normally and (2) information representing a usable recording capacity of the recording medium;

wherein the control apparatus comprises:
 (c1) a monitor camera information storage for storing monitor camera information representing a correspondence between the monitor cameras and the video recording apparatuses designated as destinations for recording the video signals generated by the monitor cameras;
 (c2) a video recording apparatus information storage for storing video recording apparatus information including information representing recording capabilities of the video recording apparatuses and information representing usable recording capacities of the video recording apparatuses;
 (c3) operation managing means for deciding that at least one of the video recording apparatuses fails to record a video signal in cases where the operating condition notice information from said one of the video recording apparatuses continues to be not received for longer than a prescribed time interval or the usable recording capacity of said one of the video recording apparatuses drops below a prescribed level;
 (c4) video recording apparatus deciding means for deciding a new video recording apparatus among the video recording apparatuses which should be a new destination for at least one video signal which has been assigned to the failed video recording apparatus decided by the operation managing means in response to the monitor camera information stored in the monitor camera information storage and the video recording apparatus information stored in the video recording apparatus information storage;
 (c5) commanding means for commanding the new video recording apparatus decided by the video recording apparatus deciding means to record said at least one video signal generated by at least one monitor camera corresponding in destination to the failed video recording apparatus decided by the operation managing means, and commanding said at least one monitor camera corresponding in destination to the failed video recording apparatus to change the destination to the new video recording apparatus; and (c6) information updating means for updating the monitor camera information stored in the monitor camera information storage and the video recording apparatus information stored in the video recording apparatus information storage in response to contents of the decision by the video recording apparatus deciding means.

2. A video recording control system as recited in claim 1, wherein in cases where the failed video recording apparatus decided by the operation managing means has recorded two or more of the video signals generated by the monitor cameras, the video recording apparatus deciding means decides two or more new video recording apparatuses among the video recording apparatuses so as to decide a correspondence between the monitor cameras and the new video recording apparatuses for recording said two or more of the video signals which have corresponded to the failed video recording apparatus.

3. A video recording control system as recited in claim 1, wherein the monitor camera information stored in the monitor camera information storage includes information representing transmission rates about the video signals generated by the monitor cameras, wherein the video recording apparatus deciding means makes a decision that the transmission rate about the video signal generated by at least one of the monitor cameras should be reduced and thereby deciding a new transmission rate, wherein the commanding means commands the monitor camera related with the transmission-rate-reduction decision to change the transmission rate to the new transmission rate, and wherein the information updating means updates the transmission rate information about the monitor camera related with the transmission-rate-reduction decision in accordance with the new transmission rate.

4. A video recording control system as recited in claim 1, wherein the monitor camera information stored in the monitor camera information storage includes information representing qualities of the video signals generated by the monitor cameras, wherein the video recording apparatus deciding means makes a decision that the quality of the video signal generated by at least one of the monitor cameras should be reduced and thereby deciding a new quality, wherein the commanding means commands the monitor camera related with the quality-reduction decision to change the quality to the new quality, and wherein the information updating means updates the quality information about the monitor camera related with the quality-reduction decision in accordance with the new quality.

5. A video recording control system comprising a plurality of monitor cameras, a plurality of video recording apparatuses, and a network connecting the monitor cameras and the video recording apparatuses;

wherein each of the monitor cameras comprises:

(a1) image taking means for taking an image of a scene at a prescribed place and generating a video signal representing the taken image; and (a2) video transmitting means for sending the video signal generated by the image taking means to a prescribed video recording apparatus among the video recording apparatuses;

wherein each of the video recording apparatuses comprises:

(b1) video receiving means for receiving a video signal sent by a prescribed monitor camera among the monitor cameras;

(b2) video recording means for recording the video signal received by the video receiving means on a recording medium;

(b3) operating condition transmitting means for periodically transmitting operating condition notice information to the other video recording apparatuses or transmitting operating condition notice information to the other video recording apparatuses upon detection of a change in an operating condition, the operating condition notice information including at least one of (1) information representing that the related video recording apparatus is operating normally and (2) information representing a usable recording capacity of the recording medium;

(b4) a monitor camera information storage for storing monitor camera information representing a correspondence between the monitor cameras and the video recording apparatuses designated as destinations for recording the video signals generated by the monitor cameras;

(b5) a video recording apparatus information storage for storing video recording apparatus information including information representing recording capabilities of the video recording apparatuses and information representing usable recording capacities of the video recording apparatuses;

(b6) operation managing means for deciding that at least one of the video recording apparatuses fails to record a video signal in cases where the operating condition notice information from said one of the video recording apparatuses continues to be not received for longer than a prescribed time interval or the usable recording capacity of said one of the video recording apparatuses drops below a prescribed level;

(b7) video recording apparatus deciding means for deciding whether or not the related video recording apparatus can be a new destination for at least one video signal which has been assigned to the failed video recording apparatus decided by the operation managing means in response to the monitor camera information stored in the monitor camera information storage and the video recording apparatus information stored in the video recording apparatus information storage;

(b8) commanding means for, when the video recording apparatus deciding means decides that the related video recording apparatus can be a new destination for at least one video signal which has been assigned to the failed video recording apparatus, commanding at least one monitor camera corresponding in destination to the failed video recording apparatus to designate the present video recording apparatus as a new destination;

(b9) information updating means for updating the monitor camera information stored in the monitor camera information storage and the video recording apparatus information stored in the video recording apparatus information storage in response to contents of the decision by the video recording apparatus deciding means; and (b10) updated contents notifying means for notifying the contents of the updating by the information updating means to the other video recording apparatuses.

6. A video recording control system as recited in claim 5, wherein in cases where the failed video recording apparatus decided by the operation managing means has recorded two or more of the video signals generated by the monitor cameras, the video recording apparatus deciding means decides that the related video recording apparatus can be a new destination for said two or more of the video signals and the commanding means commands the monitor cameras, which have corresponded in destination to the failed video recording apparatus, to designate the present video recording apparatus as a new destination.

7. A video recording control system comprising:
- a plurality of monitor cameras generating video signals respectively;
- a plurality of video recording apparatuses;
- wherein the monitor cameras are assigned to the video recording apparatuses in a manner such that each of the video recording apparatuses corresponds to at least one assigned monitor camera, wherein each of the monitor cameras sends its video signal to the assigned one of the video recording apparatus, and wherein the video recording apparatuses record the video signals sent from the monitor cameras;
- first means for detecting a failure of each of the video recording apparatuses;
- second means for, when the first means detects a failure of at least one of the video recording apparatuses, changing the assignment of the monitor cameras to the video recording apparatuses so that at least one of the monitor cameras which has been assigned to the failed video recording apparatus will be newly assigned to normal one of the video recording apparatuses; and
- third means for, when the first means detects a failure of at least one of the video recording apparatuses, reducing a transmission rate of at least one of the video signals generated by the monitor cameras.

8. A video recording control system as recited in claim 7, wherein the second means comprises means for, when the first means detects a failure of at least one of the video recording apparatuses, changing the assignment of the monitor cameras to the video recording apparatuses so that at least a first one of the monitor cameras which has been assigned to the failed video recording apparatus will be newly assigned to a first normal one of the video recording apparatuses, and that at least a second one of the monitor cameras which has been assigned to the failed video recording apparatus will be newly assigned to a second normal one of the video recording apparatuses.

9. A video recording control system as recited in claim 7, wherein the video recording apparatuses periodically output respective notice signals while operating normally, and the first means comprises (1) means for deciding whether or not each of the video recording apparatuses periodically outputs its notice signal, and (2) means for, when it is decided that at least one of the video recording apparatuses does not periodically output its notice signal, deciding that said one of the video recording apparatuses has failed.

10. A video recording control system as recited in claim 7, wherein the first means comprises:
- means for detecting usable recording capacities of the respective video recording apparatuses;
- means for deciding whether or not each of the detected usable recording capacities is less than a prescribed level; and
- means for, when it is decided that one of the detected usable recording capacities is less than the prescribed level, deciding that the video recording apparatus having said one of the detected usable recording capacities has failed.

* * * * *